Figure 1:
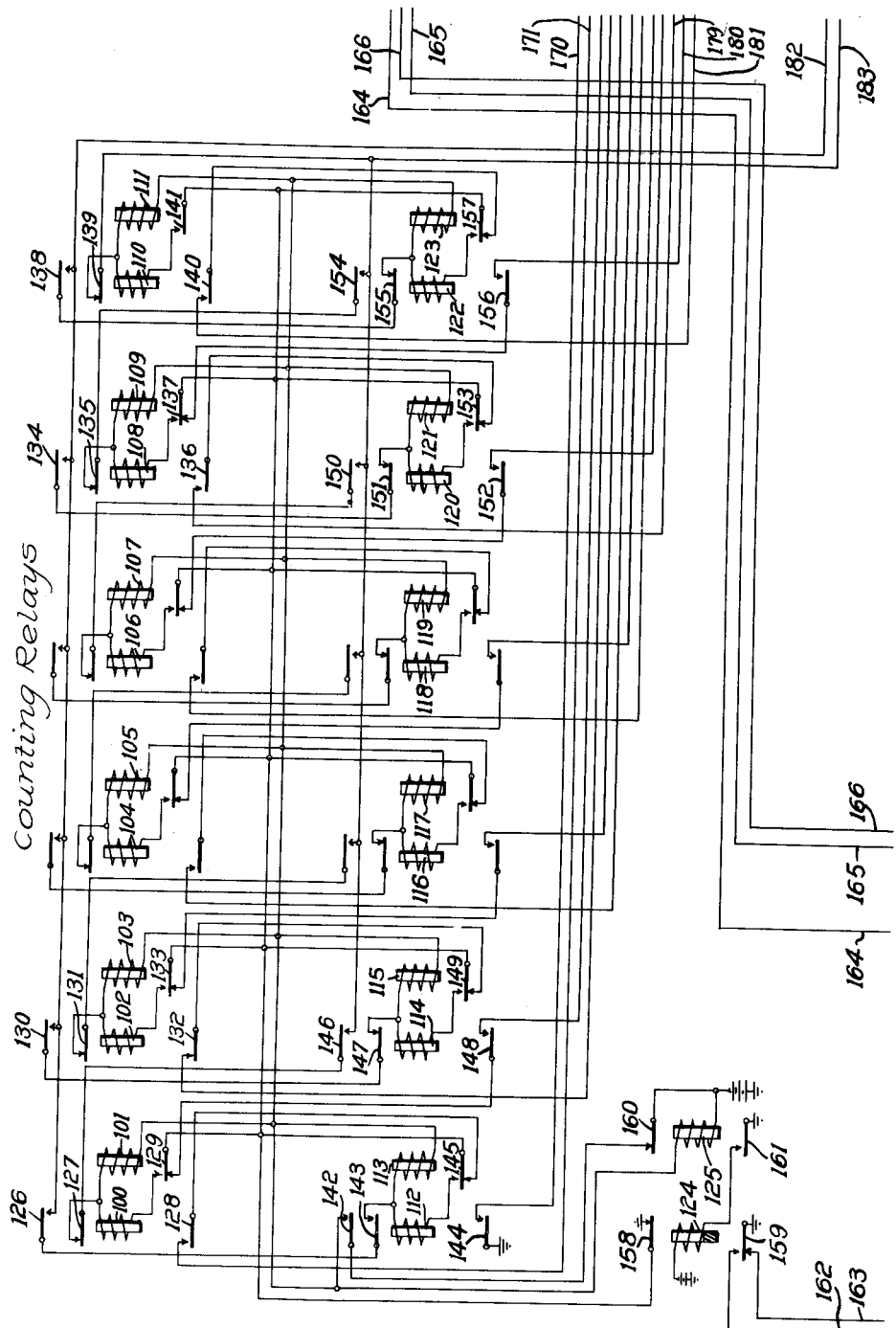

Dec. 24, 1929.　　　T. U. WHITE　　　1,740,487
CONTROL SYSTEM
Filed June 6, 1924　　　8 Sheets-Sheet 1

WITNESSES:

INVENTOR
Thomas U. White.
BY
ATTORNEY

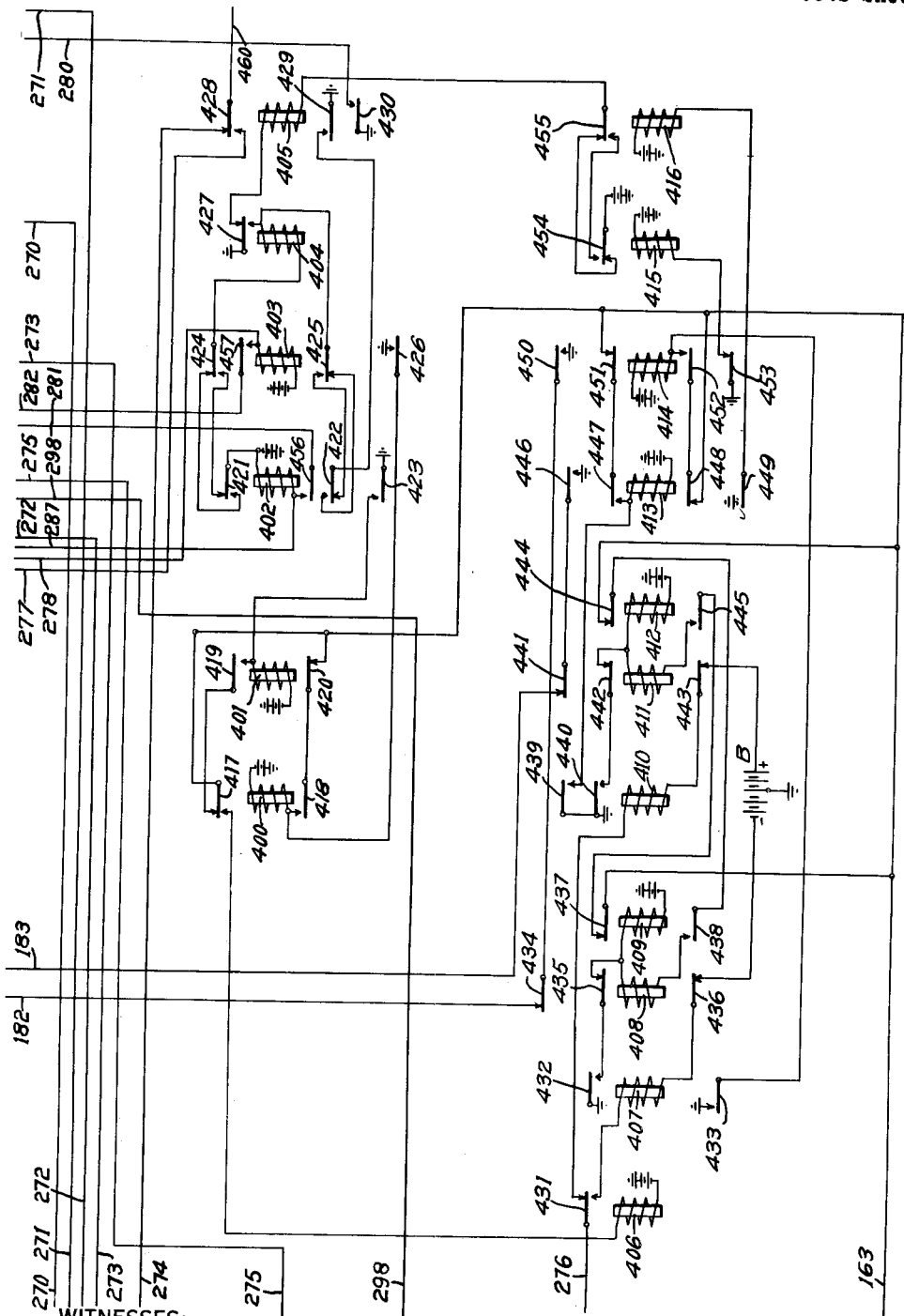

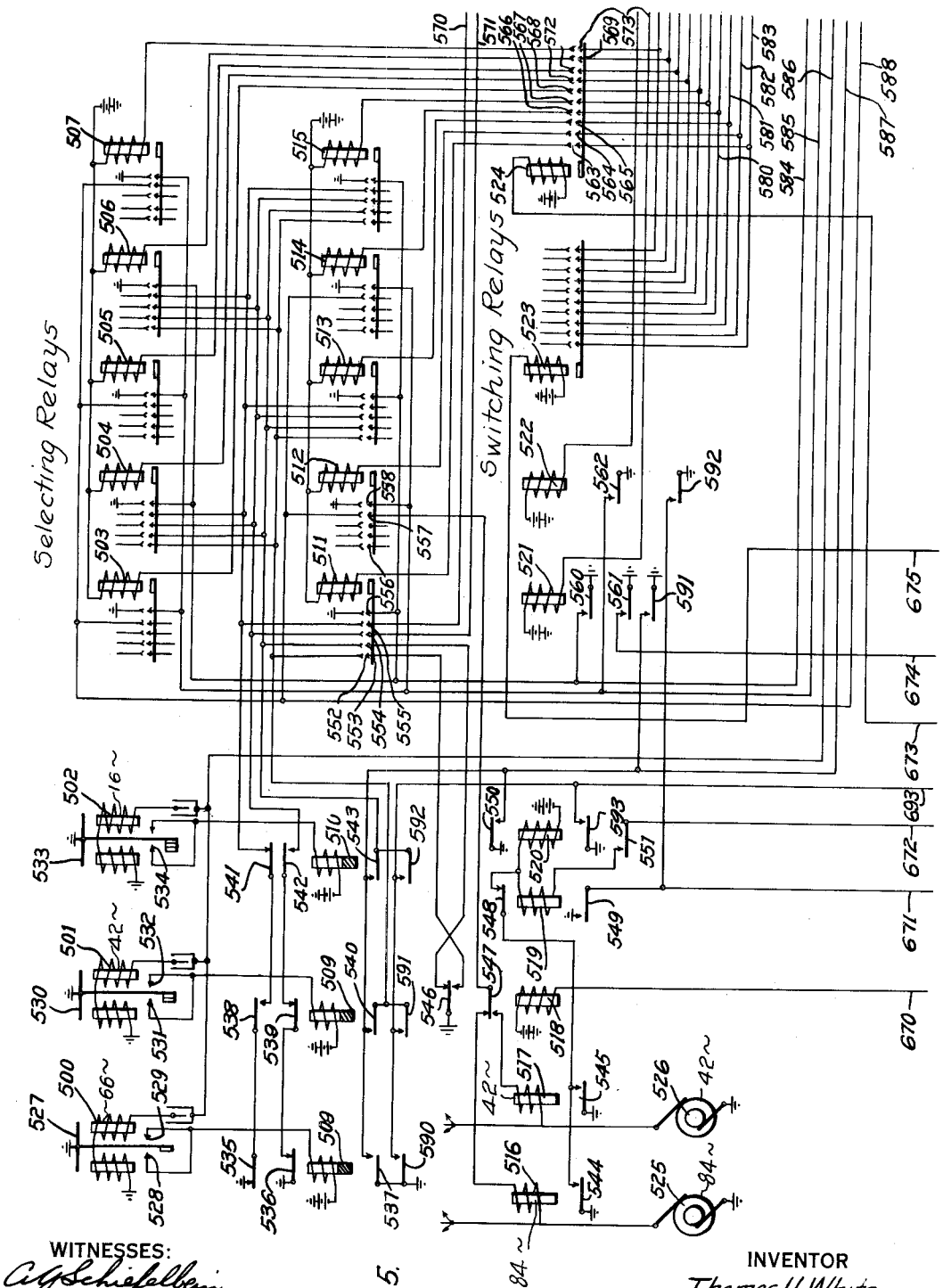

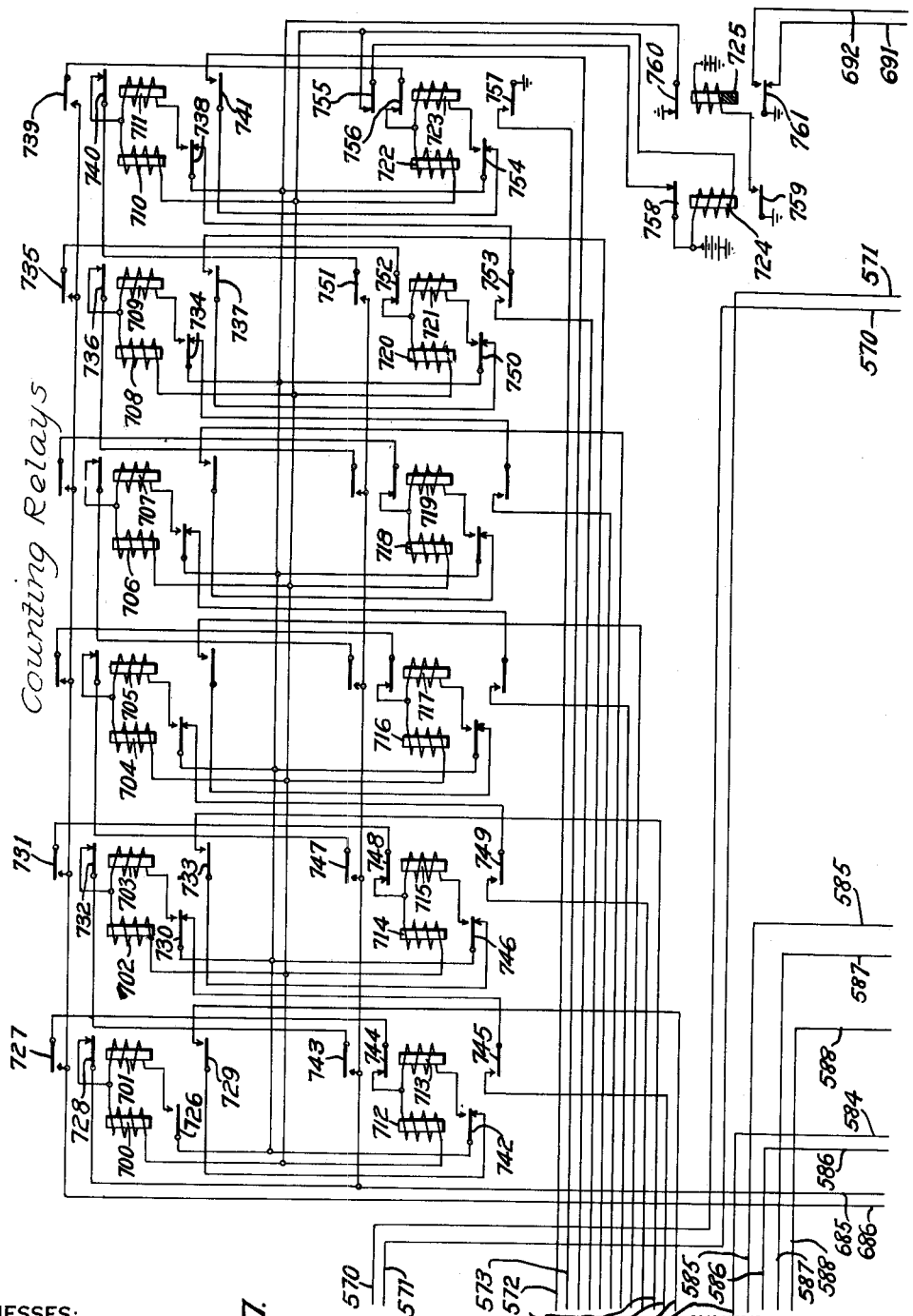

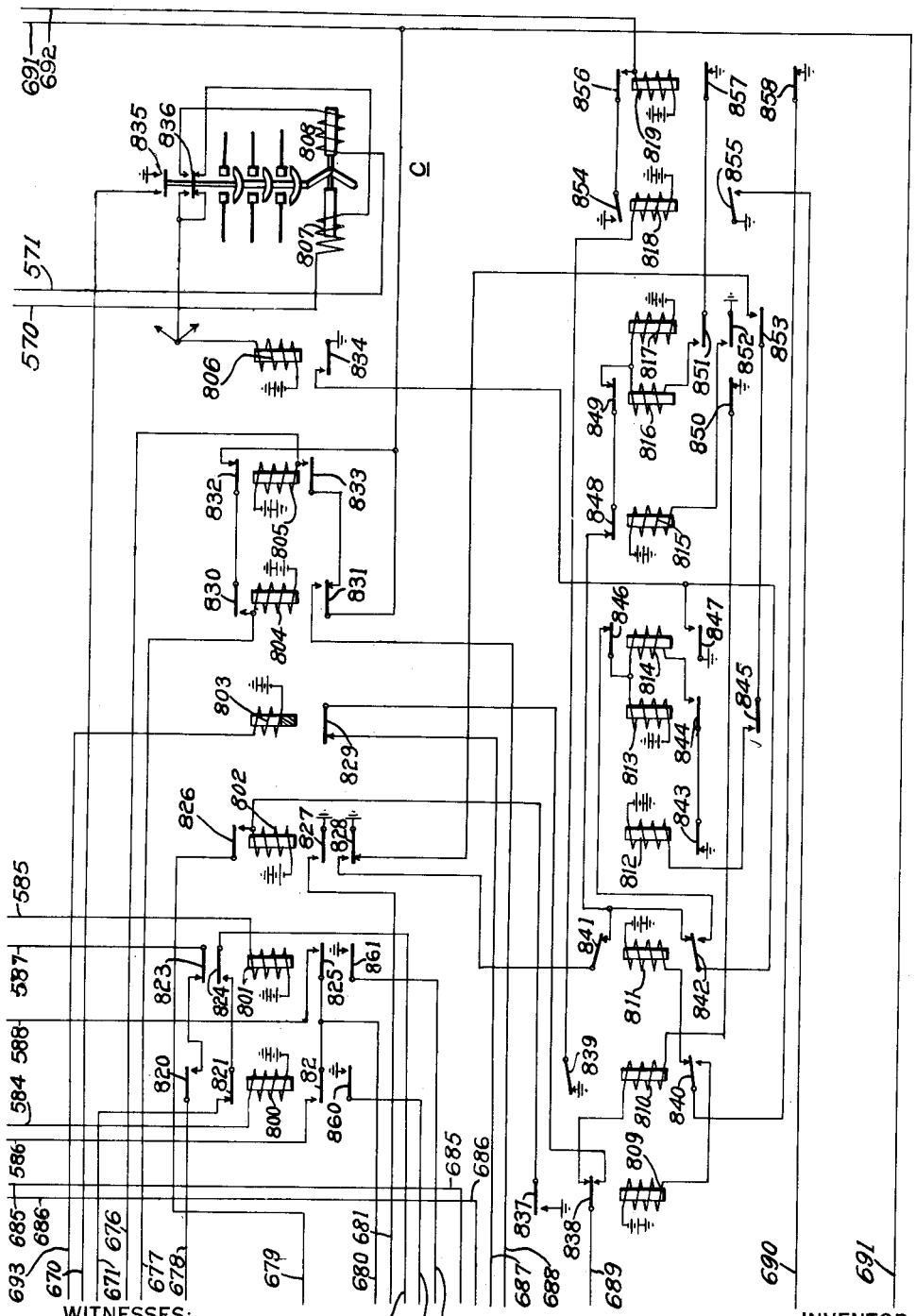

Patented Dec. 24, 1929

1,740,487

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed June 6, 1924. Serial No. 718,360.

My invention relates to control systems and particularly to selective systems for supervising and controlling remotely-disposed electrical equipment from a central point or dispatcher's office.

One object of my invention is to provide a supervisory control system that may be operated over a single pair of wires.

Another object of my invention is to provide means for operating relay chains at central and distant stations synchronously over a single pair of wires and to employ these same wires for sending supervisory and control signals to control and supervise the electrical equipment at the remote station.

Another object of my invention is to provide a two-wire, high-speed supervisory control system that may be used to supervise and control a large number of apparatus units at a distant station.

Another object of my invention is to provide improved signalling means including different frequencies of alternating current for both controlling and supervising the apparatus units in a distant station.

Another object of my invention is to provide improved locking means for maintaining the signalling devices in operated position to prevent the wrong signal being given in the event that the battery supply is momentarily interrupted.

A still further object of my invention is to provide means for maintaining the selective apparatus in connection with a predetermined apparatus unit until such unit has performed the desired operation and an answerback signal obtained, at the central station, indicative of the functioning of the unit.

The above and other objects of the invention will be described in the detailed specification which is to follow.

Referring now to the drawings, comprising Figures 1 to 8, inclusive, I have shown by means of conventional diagrams the apparatus and circuits for carrying out my invention.

The apparatus shown in Figs. 1 to 4, inclusive, is that located at the central station or dispatcher's office, while the apparatus shown in Figs. 5 to 8, inclusive, is that located at the distant station or substation.

In practicing my invention, I provide a chain of counting relays at the dispatcher's office and a chain of counting relays, corresponding in number, at the substation in which are located the apparatus units that it is desired to control and supervise. There are two groups of selecting relays associated with each group of counting relays, although the number of groups of selecting relays may be increased in order to increase the capacity of the system. In addition, two switching relays are provided, one for each group of selecting relays.

A drive circuit is located at both the dispatcher's office and station for controlling the operation of the counting relays. The counting relay chains and control circuits are connected together by means of a one-conductor trunk line. A ground return circuit is employed, although it is obvious that, instead of using this ground return, a separate circuit may be provided, which is preferable in practice.

In the dispatcher's office, a group of keys are provided corresponding in number to the number of apparatus units that it is desired to control. A common control key is also located at the office.

In order that the dispatcher may be apprised of the condition of the units in the station, two signalling lamps are provided for each apparatus unit under supervision. Sources of alternating current of three different frequencies are provided at the dispatcher's office and sources of alternating current of two different frequencies are provided at the substation for controlling the operation of the apparatus units and the supervisory signalling devices, as will appear. Mechanically tuned relays are provided at both the dispatcher's office and substation that are responsive to predetermined frequencies of alternating current to control the apparatus units and supervisory signalling devices in a manner that will be described.

When the dispatcher desires to control an apparatus unit at the station or substation, he will operate the key associated with this particular unit in the proper direction and also the control key. As a result of this operation, the drive circuits function to operate the relays in the counting chains at the office and station in a predetermined sequence. The drive circuit is operated by the alternate application of current from two separate batteries. Checking means are provided so that, unless the two batteries are connected to the drive circuit alternately, the apparatus does not function.

Simultaneously with the first cycle of the counting chains, a switching relay is operated at both the dispatcher's office and substation to connect the relays of one of the auxiliary selecting groups and these relays are operated under the control of the counting relays. As the selecting relays operate, they alternately connect the signalling apparatus and the control apparatus to the signalling circuit extending between the dispatcher's office and substation.

If no controlling or signalling operation is performed, the control and signalling apparatus is merely disconnected from the circuit extending between the dispatcher's office and station and the control circuit functions. If a signalling or control operation is performed, the control circuit remains disconnected until the signalling or control operation is completed. In this manner, it is possible to supervise and control a large number of apparatus units over a single pair of wires at a high rate of speed.

If the apparatus unit that it is desired to operate is not selected by the operation of the selecting relays in the first group, the counting chains will be reoperated. The previously mentioned switching relays will be released and another switching relay at the dispatcher's office and substation will be operated to connect the relays in the second auxiliary selecting groups under control of the counting relays.

When the proper apparatus unit is selected, alternating current of a predetermined frequency is sent over the control circuit to operate a relay at the substation that is tuned mechanically to the particular frequency of alternating current applied. The operation of this relay causes the operation of the selected apparatus unit.

In the meantime, the control circuit is disconnected from the circuit extending to the dispatcher's office and the relay selecting apparatus maintains the connection with the desired unit. When the unit operates, alternating current of a predetermined frequency is applied to the trunk circuit extending between the dispatcher's office and substation, and a relay at the office, that is tuned to the frequency applied, responds to control the operation of the supervisory signalling devices associated with the selected unit, to indicate its operation. As a result of the operation of the signalling devices, the drive circuit is reconnected to the trunk circuit and again starts to function. After all the relays of the auxiliary selecting relay groups have been operated, the relay selecting apparatus is restored to normal.

In the event that an apparatus unit at the substation operates under the control of automatic devices, responsive to circuit conditions, the operation of supervisory signals takes place, under the control of the supervisory selecting apparatus, in substantially the same manner as that described.

Referring now more particularly to Fig. 1, relays 100 to 123, inclusive, comprise the group or chain of counting relays at the dispatcher's office. Relays 124 and 125 are control relays for controlling certain releasing operations.

Figure 2:
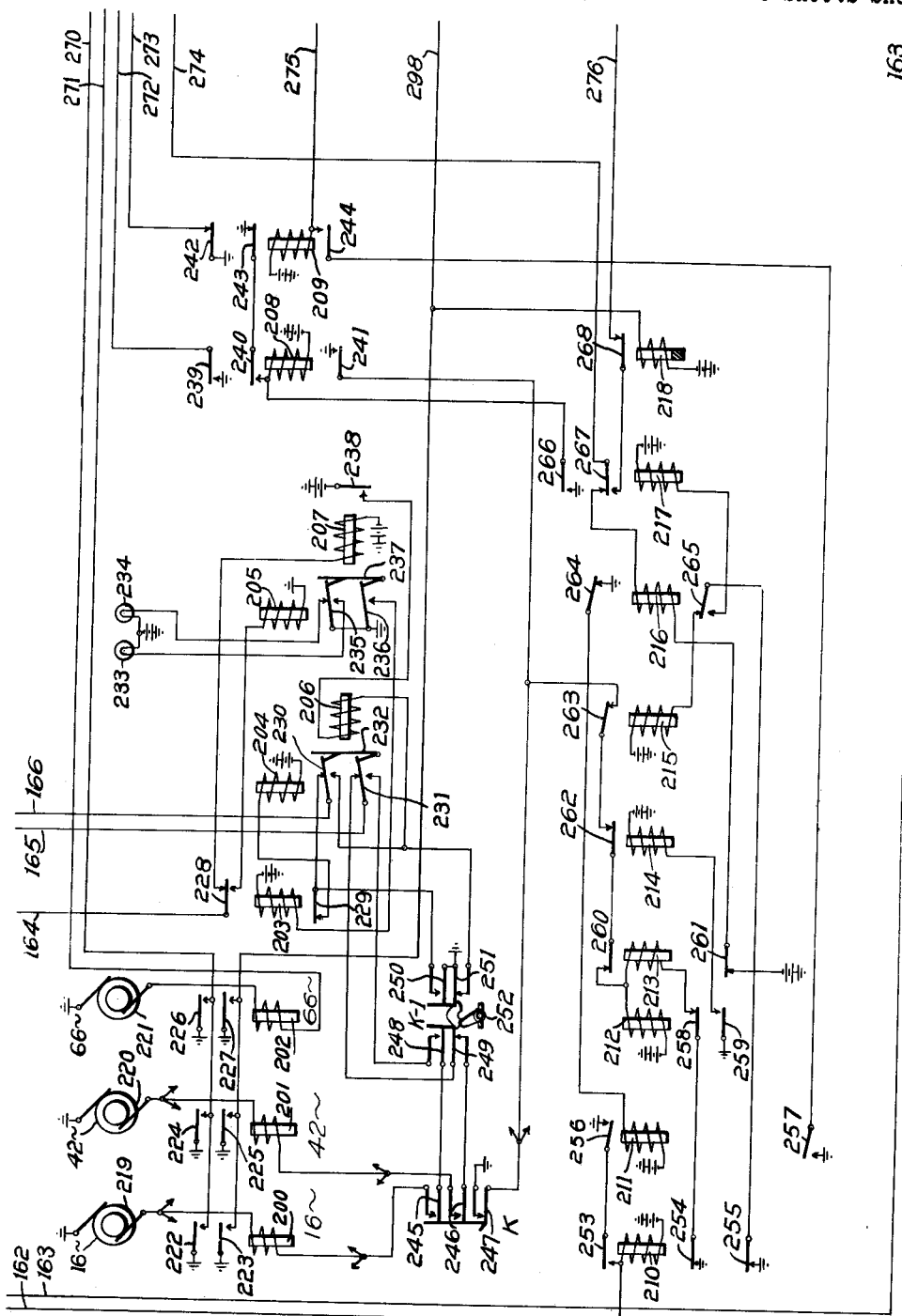

In Fig. 2, a key K is of the ordinary non-locking single-throw type. A key K—1 is a special twist type of two-position key. There is one such key for each apparatus unit that it is desired to control. Keys, such as K—1, are so constructed that, when operated, they lock in one of two positions. The key K—1 has been shown in one position with the springs 249 and 251 engaging their resting contacts and the springs 248 and 250 out of engagement with their working contacts. When the handle 252 of the key K—1 is turned to its other position, the springs 249 and 251 are forced from engagement with their resting contacts and the springs 248 and 250 are forced in engagement with their working contacts. By means of this construction, it will be seen that it is impossible for the dispatcher to inadvertently operate a key by leaning on the control board or by the key catching in any part of his clothing.

Relays 200 to 202 are alternating-current relays common to the selective apparatus at the dispatcher's office and are included in the respective conductors extending to alternating-current generators 219, 220 and 221. The alternating-current generator 219 may be of any well known type and is adapted to create an alternating current of a frequency of 16 cycles. The generators 220 and 221 create alternating currents of 42 and 66 cycles, respectively. The frequencies of alternating current generated by these generators have been chosen arbitrarily and may be changed in any desired manner so long as the frequencies chosen do not interfere with each other.

The relays 203 to 207, inclusive, are associated with the key K—1 and control the functioning of the supervisory signalling devices and the application of alternating current to the trunk circuit in a manner to be described. The relay 204 has its armatures so arranged with respect to the relay 206 that the armature 232 of the relay 206 maintains the armatures 231 and 230 in their attracted position. The relays 205 and 207 are similarly positioned with respect to each other so that the armature 237, when retracted, maintains the armatures 235 and 236 in engagement with their working contacts. Signalling devices 233 and 234 are lamps, the circuits of which are controlled by the armature 235. Relays 208 to 218, inclusive, are of the ordinary type and constitute part of the control circuit.

Relays 400 to 416, inclusive, Fig. 4, are of the ordinary type and constitute another portion of the control circuit.

Figure 3:
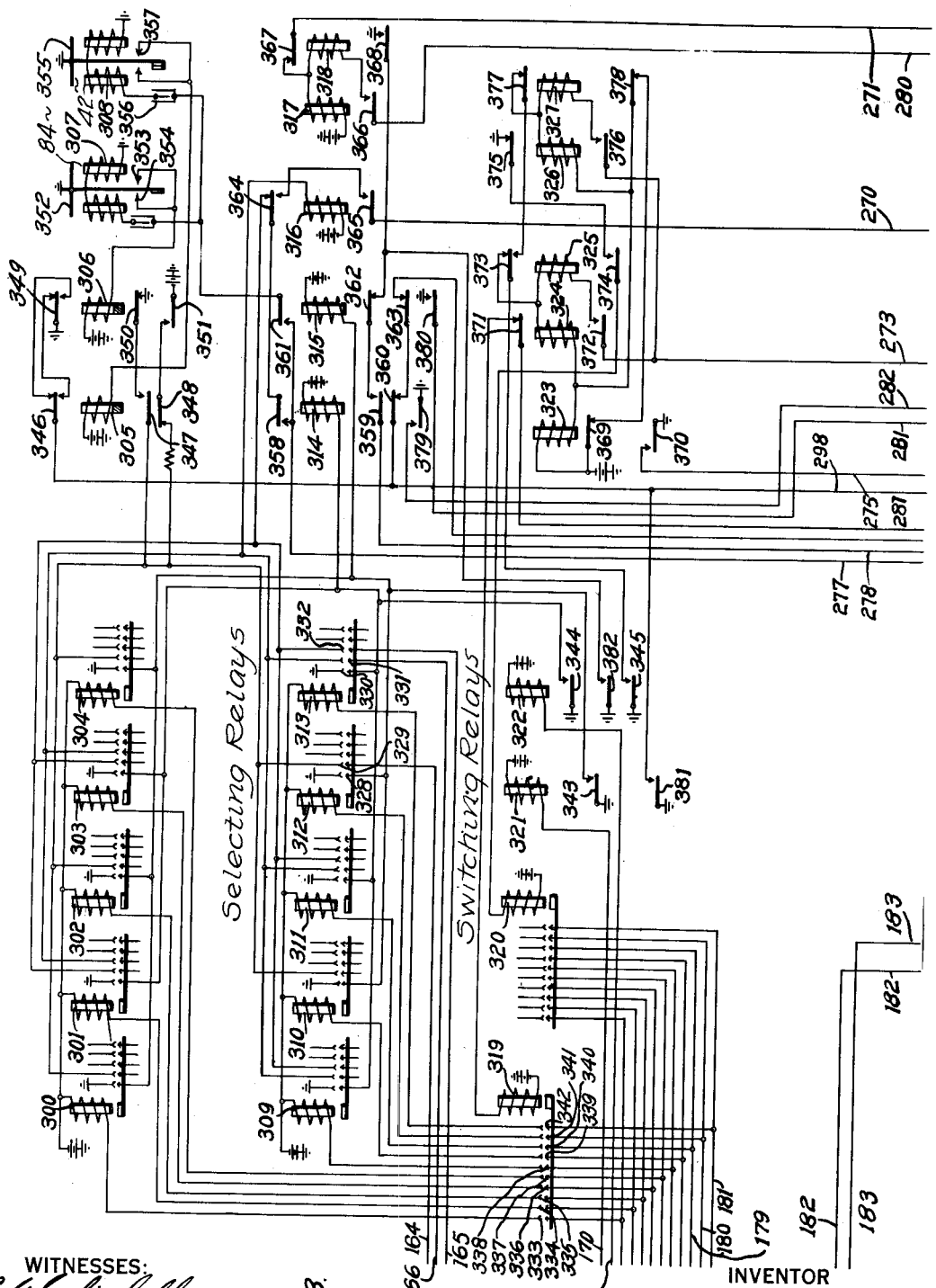

In Fig. 3, relays 300 to 304, inclusive, and relays 309 to 313, inclusive, are multi-contact relays and comprise the first selecting group. Relays 319 and 320 are multi-contact switching relays. Relays 321 and 322 control certain switching operations. Relays 305 to 308, inclusive, are associated with the signalling circuit. The relays 305 and 306 are of the ordinary slow-acting type, while the relays 307 and 308 are of the pendulum type, tuned to respond to predetermined frequencies of alternating current. Relays 314 to 318, inclusive, and relays 319 to 327, inclusive, comprise the remaining relays of the control circuit at the dispatcher's office.

Relays 500 to 502, inclusive, Fig. 5, are pendulum-type relays that are tuned mechanically to respond to alternating currents whose frequencies are 66, 42 and 16, cycles, respectively. Relays 508 to 510, inclusive, are slow-acting relays of the ordinary type. Relays 516 and 517 are alternating-current relays. Relays 503 to 507, inclusive, and relays 511 to 515, inclusive, comprise the first group of selecting relays at the substation. Relays 523 and 524 are multi-contact switching relays. Relays 518 to 520, inclusive, comprise a portion of the control circuit. Relays 521 and 522 also control certain functions of the control circuit.

Figure 6:
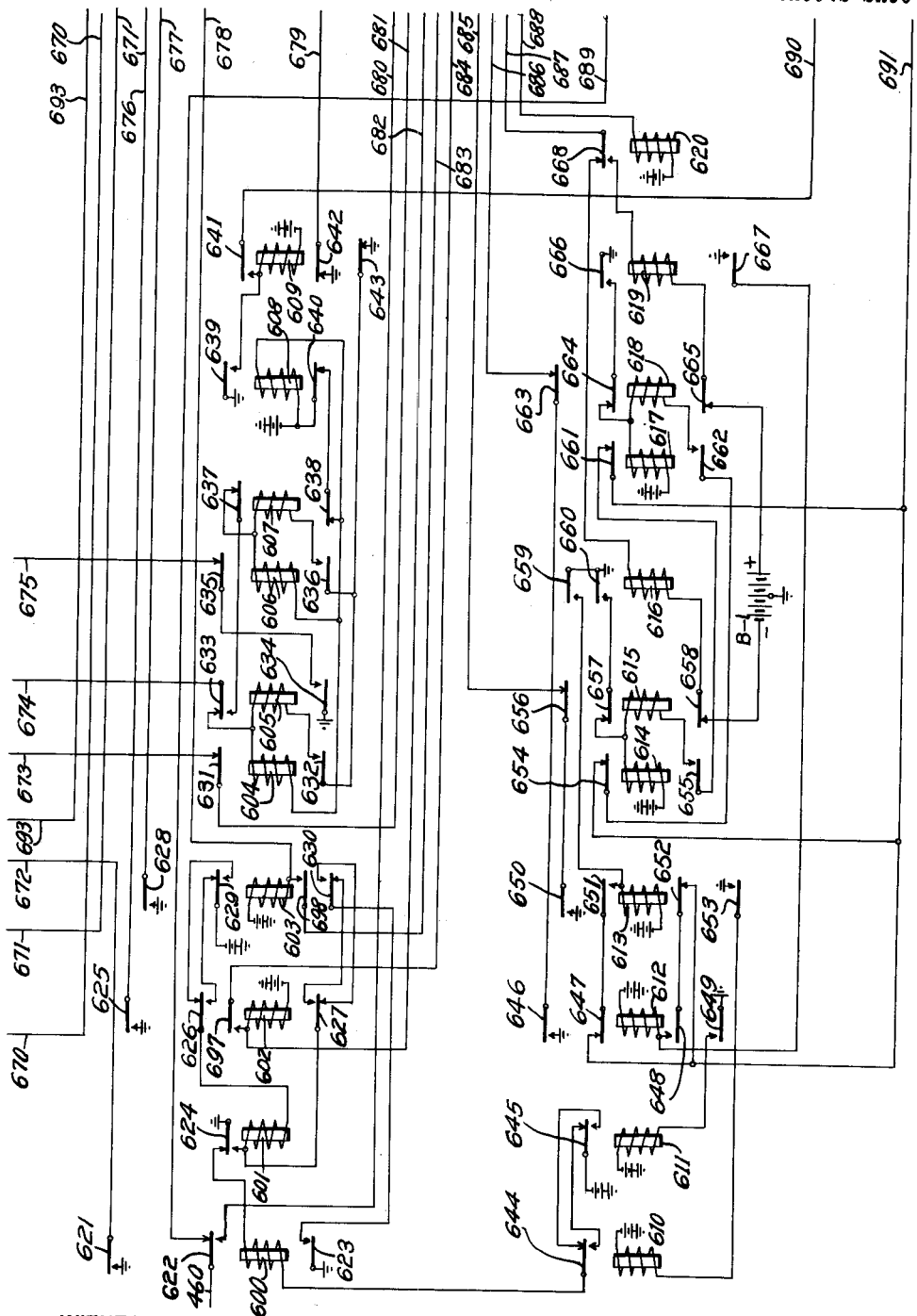

Relays 600 to 620, inclusive, of Fig. 6 comprise another portion of the control circuit at the substation.

Relays 700 to 723, inclusive, of Fig. 7 constitute the group of counting relays at the substation. Relays 724 and 725 control certain releasing operations.

Relays 800 to 805, inclusive, and relays 809 to 819, inclusive, of Fig. 8 comprise the remaining portion of the control circuit at the substation. Relay 806 is a common low-resistance relay in series with the operating coils of all the circuit breakers, such as C. The circuit breaker C may be of any ordinary type and may perform any desired operation in the substation.

Having described the apparatus shown in the drawings, I will now explain its detailed operation. For this purpose, it will be assumed that the dispatcher desires to close the circuit breaker C. In order to accomplish this result, the dispatcher will operate the key at the office corresponding to this unit at the substation in the proper direction. It will be assumed that the key K—1 is the proper key and that this key is operated so that its springs are in the position shown. The dispatcher will then operate the key K.

In the normal condition of the system, a circuit is completed which extends from battery by way of back contact and armature 261, relay 216, back contact and armature 267, conductor 274, back contact and armature 428, trunk conductor 460, armature 622 and its back contact, conductor 689, armature 838 and its back contact, relay 810, armature 850 and its back contact, and thence to ground. The relays 216 and 810 are energized over this circuit.

The relay 216, upon being operated, completes a circuit for the relay 211 at armature 264, and completes a circuit at armature 265 which extends from ground by way of back contact and armature 255, armature 265 and its front contact, and relay 215 to battery. The relay 215 is energized to prepare a circuit at armature 263 for the relay 212. The relay 211 is operated to bring about the release of the relay 210 in a manner to be described.

At the substation, when the relay 810 is operated, a circuit is completed for the relay 818 which is operated to release the relay 819. The release of the relay 819 brings about the closing of a circuit which extends from ground by way of back contact and armature 858, armature 840 and its front contact and relay 811 to battery. The relay 811 is energized to prepare circuits for the relay 817 at armatures 841 and 842.

When the key K is first operated, a circuit is completed extending from ground by way of working contact of spring 247 and said spring, front contact and armature 263, back contact and armature 262, armature 260 and its back contact and relay 212 to battery. The relay 212 is energized to complete a circuit for the relay 214 at armature 259, and to complete a circuit at armature 258 extending from ground by way of back contact and armature 254, armature 258 and its front contact, relay 213 and relay 212 to battery. The relay 213 is short-circuited so long as the original energizing circuit of the relay 212 is completed. The relay 214, upon being energized, removes the short-circuit from the relay 213, thus permitting this relay to operate. As a result of this operation, the circuit of the relays 216 and 810 is opened.

When the circuit of the relay 216 is opened, this relay is deenergized to open the circuit of the relay 211 at armature 264 and to complete a circuit extending from ground by way of back contact and armature 255, armature 265 and its front contact, and relay 217 to battery. The relay 211 is deenergized to prepare a point in the locking circuit of the relay 210. The relay 217, upon being operated, prepares a circuit for the line relay 410 at armature 267, and at armature 266 completes a circuit for the relay 208. The relay 208, upon being energized, establishes a locking circuit for itself at armature 240, prepares a circuit for the relay 212 at armature 241, and completes a circuit extending from ground by way of front contact and armature 239, conductor 272, armature 371 and its back contact and switching relay 319 to battery. The switching relay 319 is energized to connect the selecting relays 300 to 304, inclusive, and relays 309 to 313, inclusive, under the control of the counting relays 100 to 123, inclusive.

At the substation, the relay 810, upon being deenergized, opens the circuit of the relay 818 at armature 839 and at armature 840 completes a circuit extending from ground by way of back contact and armature 858, armature 840 and its back contact and relay 809 to battery. The relay 818, upon being deenergized, prepares a point in the locking circuit of the relay 819 at armature 854, and at armature 855 prepares a point in the locking circuit of the relay 609. The relay 809, upon being energized, completes the trunk circuit at armature 838, and at armature 837 completes a circuit for the relay 802.

The relay 802 operates to establish a locking circuit for itself over a path which extends from ground by way of back contact and armature 642, conductor 679, armature 826 and its front contact and relay 802 to battery. Other results of the operation of the relay 802 are that a circuit is prepared for the relay 817 at armature 828 and at armature 827 a circuit is completed extending from ground by way of said armature and its front contact, conductor 681, armature 631 and its back contact, conductor 673 and switching relay 524 to battery. The switching relay 524 is energized to connect the selecting relays 503 to 507, inclusive, and relays 511 to 515, inclusive, under the control of the counting relays 700 to 723, inclusive.

The drive circuit extends from the positive pole of the battery B at the dispatcher's office by way of back contact and armature 443, line relay 410, back contact and armature 431, conductor 276, back contact and armature 268, front contact and armature 267, conductor 274, back contact and armature 428, trunk conductor 460, armature 622 and its back contact, conductor 689, armature 838 and its front contact, armature 829 and its back contact, conductor 687, armature 668 and its back contact, line relay 616, and armature 658 and its back contact to the negative pole of the battery B—1 at the substation, and thence to ground.

As portions of the batteries B and B—1 are now in series, these batteries will assist each other and the line relays 410 and 616 at the dispatcher's office and substation, respectively, will now be energized.

The relay 410, upon being energized, completes a circuit for the relay 412 at armature 440, and at armature 439 completes a circuit for the relay 413. The relay 412, upon being energized, opens one point in the locking circuit of the relays 408 and 409 at armature 444, and at armature 445 completes a circuit which extends from ground by way of armature 159 and its back contact, conductor 163, back contact and armature 437, armature 445 and its front contact, relay 411 and relay 412 to battery.

The relay 411 is not energized so long as the original energizing circuit for the relay 412 is completed. The relay 413, upon being energized, opens one point in the locking circuit of the relay 414 at armature 448, establishes a locking circuit for itself to ground upon the conductor 163 at armature 447, and at armature 449 completes a circuit for the relay 416. Another result of the operation of the relay 413 is that, at armature 446, a circuit is completed extending from ground by way of front contact and said armature, armature 441 and its back contact, conductor 183, armature 139 and its back contact, relay 111, back contact and armature 142, and back contact and armature 160 to battery.

The counting relay 111 is energized over the above circuit and operates to complete a circuit for the relay 110 which extends from ground by way of back contact and armature 158, armature 141 and its front contact, relay 110, relay 111, back contact and armature 142, and back contact and armature 160 to battery. The relay 110 is not energized over this circuit by reason of the fact that it is short-circuited so long as the original energizing circuit of the relay 111 is completed.

The relay 416, upon being energized, completes a circuit extending from battery by way of armature 454 and its back contact, front contact and armature 455, relay 405, back contact and armature 427 to ground. The relay 405 is operated to disconnect the line relay 410 from the conductor 460 at armature 428, to connect the trunk conductor 460 to the conductor 277 at the front contact of this armature, to prepare a point in the circuit of the relay 404 at armature 429, and to prepare a circuit at armature 430 for the relay 318.

When the trunk conductor 460 is disconnected from the winding of the line relay 410, this relay is deenergized and the original energizing circuit of the relay 413 is opened. The short circuit is removed from the winding of the relay 411. The relay 411 is energized to disconnect the positive pole of the battery B from one terminal of the relay 410 at armature 443, to open another point in the original energizing circuit of the relay 412 at armature 442, and to remove the short-circuit at armature 441 from the counting relay 110.

The counting relay 110 is operated to open another point in the original energizing circuit of the relay 111 at armature 139, to prepare a circuit for the relay 123 at armature 138 and to complete a circuit which extends from ground by way of back contact and armature 158, armature 157 and its back contact, armature 140 and its front contact, conductor 181, spring 342 and its working contact, and selecting relay 313 to battery.

The selecting relay 313 is energized to complete one point in the control circuit at spring 331 and to complete a circuit for the relay 314 at spring 330. The relay 314 operates to connect the conductor 277 to the conductor 165 at armature 358, to prepare a point in the circuit of the relay 403 at armature 359 and to open one point in the circuit of the relay at 402 at armature 360.

At the substation, the line relay 616, upon being energized, completes a circuit for the relay 613 at armature 659 and at armature 660 completes a circuit for the relay 614. The relay 614 operates to open one point in the locking circuits of the relays 617 and 618 at armature 654 and at armature 655 to complete a circuit extending from ground by way of armature 761 and its back contact, conductor 691, armature 661 and its back contact, armature 655 and its front contact, relay 615 and relay 614 to battery. The relay 615 is not energized until the original energizing circuit of the relay 614 is opened. The relay 613, upon being energized, operates to open one point in the locking circuit of the relay 612 at armature 652, to close a locking circuit for itself at armature 651 extending to ground upon conductor 691, to complete a circuit for the relay 610 at armature 653, and to complete a circuit which extends from ground by way of front contact and armature 650, armature 656 and its back contact, conductor 685, armature 728 and its back contact, relay 700, back contact and armature 755 and back contact and armature 758 to battery.

The relay 700 operates to complete a circuit which extends from ground by way of back contact and armature 760, armature 726 and its front contact, relay 701, relay 700, back contact and armature 755, and back contact and armature 758 to battery. The relay 701 is not energized by reason of the fact that it is short-circuited as long as the original energizing circuit for the relay 700 remains completed.

The relay 610, upon being energized, operates to complete a circuit extending from battery by way of armature 645 and its back contact, front contact and armature 644, relay 600 and back contact and armature 624 to ground. The relay 600 is energized over the above circuit and, upon operating, prepares a circuit for the relay 601 at armature 623, at armature 622 opens the circuit of the line relay 616, at the front contact of this armature connects the trunk conductor 460 to conductor 680, and at armature 621 prepares a circuit for the relay 519.

When the circuit of the line relay 616 is opened, this relay is deenergized to open one point in the original energizing circuit of the relay 613 at armature 659 and to remove the short-circuit from the winding of the relay 615. The relay 615 is energized to disconnect the negative pole of the battery B—1 from one terminal of the relay 616 at armature 658, to open another point in the original energizing circuit of the relay 614 at armature 657, and at armature 656 to remove the short-circuit from the winding of the counting relay 701. The counting relay 701 is energized to prepare a circuit for the relay 712 at armature 727, to open another point in the original energizing circuit of the relay 700 at armature 728, and to complete a circuit which extends from ground by way of back contact and armature 760, armature 742 and its back contact, armature 729 and its front contact, conductor 583, spring 563 and its working contact and selecting relay 511 to battery.

The selecting relay 511 is energized to prepare certain signalling circuits and to place ground upon the conductor 584 at spring 556.

The grounding of conductor 584 causes the energization of the relay 800, whereby the relay 603 is connected to the conductor 587 and whereby the trunk conductor 460 is connected by way of the conductor 680 to the conductor 586.

A control circuit is now completed which extends from the ungrounded brush of the alternating-current generator 220 that creates an alternating current of a frequency of 42 cycles through the alternating-current relay 201, working contact of spring 246 and said spring, resting contact of spring 249 and said spring, working contact of armature 231 and said armature, conductor 165, spring 332 and its working contact, back contact and armature 364, armature 358 and its front contact, conductor 277, front contact and armature 428, trunk conductor 460, armature 622 and its front contact, conductor 680, armature 822 and its front contact, conductor 586, and relays 500 to 502, inclusive, in multiple to ground.

As the relay 501 is the only one tuned to respond to alternating current of a frequency of 42 cycles, the relay 501 operates its armature 530 to intermittently place ground upon the contacts 531 and 532, whereby the slow-acting relay 509 is energized.

One of the results of the operation of the relay 509 is that a circuit is completed extending from ground by way of armature 535 and its back contact, armature 538 and its front contact, armature 541 and its back contact, working contact of spring 555 and said spring, conductor 570, closing coil 807 of the circuit breaker C, pallet switch 836 and relay 806 to battery. The circuit breaker C is immediately closed.

As a result of the closure of the circuit breaker C, a circuit is completed extending from ground by way of pallet switch 835 of said circuit breaker, conductor 670 and relay 518 to battery. The relay 518 operates to prepare a signalling circuit at armature 547 and to complete a circuit which extends from ground by way of armature 546 and its front contact, spring 552 and its working contact, armature 540 and its working contact, conductor 587, armature 823 and its back contact, front contact and armature 820, conductor 678 and relay 603 to battery. The relay 803 is energized over a circuit which extends from ground by way of armature 546 and its front contact, spring 552, armature 591 and its front contact, conductor 693 and relay 803 to battery.

The relay 803 operates to momentarily prevent the connection of the line relay 619 to the control circuit. The relay 603, upon being energized, completes a circuit for the relay 601 over a path which extends from ground by way of armature 623 and its front contact, armature 630 and its front contact, back contact and armature 627, relay 601, armature 626 and its back contact and front contact and armature 629 to battery. Another result of the operation of the relay 603 is that a circuit is completed extending from ground by way of front contact and armature 628, conductor 677, and relay 804 to battery.

The relay 804 is energized to open one point in the locking circuit of the relay 805, to complete a locking circuit for itself at armature 830 and to complete a circuit which extends from the grounded conductor 691 by way of armature 831 and its front contact, conductor 688 and relay 620 to battery.

The relay 620 is operated to disconnect the line relay 616 from the control circuit and to prepare a circuit for connecting the line relay 619 thereto. The relay 601, upon being energized, operates to establish a locking circuit for itself at armature 624 and to open the circuit of the relay 600 at the back contact of this armature. The relay 600 is deenergized to open the original energizing circuit of the relay 601 at armature 623 and to disconnect the trunk conductor 460 from the relays 500 to 502, inclusive.

After a short interval of time, the relay 501 is deenergized, followed by the deenergization of the relay 509. The deenergization of the relay 509 opens the circuit of the relay 803, which is also deenergized.

The alternating-current relay 201 at the dispatcher's office is energized in series with the relay 501 at the substation. The relay 201 operates to complete a circuit at armature 225 for the relay 218 and to complete a circuit at armature 224 extending from ground by way of said armature and its front contact, conductor 271, armature 367 and its back contact, and relay 317 to battery. The relay 317 is energized to complete a circuit which extends from ground by way of armature 430 and its front contact, conductor 280, armature 366 and its front contact, relay 318 and relay 317 to battery. The relay 318 is not energized so long as the original energizing circuit for the relay 317 is completed.

When the relay 600 at the substation is deenergized, the circuit of the alternating-current relay 201 at the dispatcher's office is opened, and this relay is deenergized to open the original energizing circuit of the relay 317 at armature 224 and to open the original energizing circuit of the relay 218 at armature 225. When the relay 218 is energized, the armature 268 is operated to prevent the control circuit being completed for a short interval of time.

When the original energizing circuit of the relay 317 is opened, the relay 318 is permitted to energize. As a result of the operation of the relay 318, another point in the original energizing circuit of the relay 317 is opened at armature 367, and at armature 368 a circuit is completed extending from ground by way of front contact and armature 368, back contact and armature 362, front contact and armature 359, conductor 278 and relay 403 to battery.

The relay 403 operates to complete a circuit for the relay 400 at armature 426 and to complete a circuit extending from ground by way of armature 429 and its front contact, armature 422 and its back contact, front contact and armature 425, relay 404, armature 424 and its front contact, and back contact and armature 421 to battery. Another result of the operation of the relay 403 is to establish a locking circuit for itself at armature 457 over a path which extends from ground by way of armature 379 and its front contact, conductor 282, armature 457 and its front contact and relay 403 to battery.

The relay 400, upon being energized, operates to open one point in the locking circuit of the relay 401 at armature 417, to complete a locking circuit for itself at armature 418 to ground upon conductor 163, and at armature 417 and its front contact to complete a circuit from the grounded conductor 163, said armature and its front contact and relay 406 to battery.

The relay 406 is energized to disconnect the line relay 410 from the conductor 276 and to connect the line relay 407 thereto. The relay 404 is energized over the previously traced circuit and operates to establish a locking circuit for itself at armature 427 and to open the circuit of the relay 405 at the back contact of this armature. The relay 405 is deenergized to prepare a point in the control circuit at armature 428, to open the original energizing circuit of the relay 404 at armature 429, and to open the circuits of the relays 317 and 318 at armature 430. The relay 317 is deenergized to open another point in the circuit of the relay 318. The relay 318 is deenergized to prepare a circuit for the relay 317 at armature 367 and to open the original energizing circuit of the relay 403, which is deenergized.

When the slow-acting relay 218 is deenergized, the control circuit is completed over a path which extends from the negative pole of the battery B by way of back contact and armature 436, line relay 407, front contact and armature 431, conductor 276, back contact and armature 268, front contact and armature 267, conductor 274, back contact and armature 428, trunk conductor 460, armature 622 and its back contact, conductor 689, armature 838 and its front contact, armature 829 and its back contact, conductor 687, armature 668 and its front contact, winding of line relay 619 and armature 665 and its back contact to the positive pole of the battery B—1, and thence to ground.

The line relays 407 and 619 are energized over the above circuit. The line relay 407, upon being energized, completes a circuit for the relay 409 at armature 432, and completes a circuit for the relay 414 at armature 433. The relay 409 operates to open the circuits of the relays 411 and 412 at armature 437 and at armature 438 operates to prepare a circuit for the relay 408. The relay 411 is deenergized to prepare a circuit for the relay 412 and also for the line relay 410 at armatures 442 and 443, respectively. The relay 412, upon being deenergized, opens another point in the circuit of the relay 411 at armature 445 and at armature 444 establishes a circuit which extends from ground by way of the grounded conductor 163, back contact and armature 444, armature 438 and its front contact, relay 408 and relay 409 to battery. The above circuit is not effective so long as the original energizing circuit of the relay 409 is maintained.

The relay 414, upon being energized, opens the locking circuit of the relay 413 at armature 451, prepares a point in its locking circuit at armature 452 and at armature 453 completes a circuit for the relay 415. The relay 413 is deenergized to complete a locking circuit for the relay 414 and to open the circuit of the relay 416. The relay 416 is deenergized to prepare one point in the circuit of the relay 405. The relay 415 is energized to prepare another point in the circuit of the relay 405.

Another result of the operation of the relay 414 is that a circuit is completed extending from ground by way of the front contact and armature 450, armature 434 and its back contact, conductor 182, front contact and armature 138, armature 155 and its back contact, counting relay 123, back contact and armature 142 and back contact and armature 160 to battery.

The counting relay 123 is energized to open the circuit of the selecting relay 313 at armature 157, and to complete a circuit at the front contact of this armature for the relay 122. The latter circuit is not effective, however, until the original energizing circuit of the relay 123 is opened.

The relay 313, upon being deenergized, opens certain selecting circuits at springs 331 and 332 and at spring 330 opens the circuit of the relay 314. The relay 314, upon being deenergized, restores certain circuits to normal at armatures 358, 359 and 360, and at armature 379 opens the locking circuit of the relay 403. The relay 403 is deenergized to open the locking circuit of the relay 404. The relay 404 is deenergized to complete a circuit extending from ground by way of armature 427 and its back contact, relay 405, armature 455 and its back contact, and front contact and armature 454 to battery.

The relay 405, upon being energized, operates to prepare a circuit for the relay 404 at armature 429, to prepare a point in the circuit of the relay 318 at armature 430, to disconnect the trunk conductor 460 from the line relay 407 and to connect the said trunk conductor at the front contact of this armature to conductor 277. The disconnection of the conductor 460 from the line relay 407 causes this relay to deenergize, thereby removing the short-circuit from the relay 408 and permitting this relay to energize.

As a result of the operation of the relay 408, another point in the circuit of the relay 407 is opened at armature 436, another point in the original energizing circuit of the relay 409 is opened at armature 435, and at armature 434 the original energizing circuit for the counting relay 123 is opened. As a result of this latter operation, the relay 122 is permitted to energize.

Upon operating, the relay 122 prepares a circuit for the counting relay 109 at armature 154, opens another point in the original energizing circuit of the relay 123 at armature 155 and completes a circuit at armature 156 which extends from ground by way of back contact and armature 158, armature 137 and its back contact, armature 156 and its front contact, conductor 180, spring 341 and its working contact and selecting relay 312 to battery. The selecting relay 312 is energized to prepare a signalling circuit at spring 329 and its working contact, and at spring 328 and its working contact to complete a circuit for the relay 315. The relay 315, upon operating, connects the relays 307 and 308 to the conductor 277 at armature 361, at armature 362 opens another point in the circuit of the relay 403, at armature 380 prepares a point in the locking circuit of the relay 402 and at armature 363 prepares a circuit for the relay 402.

At the substation, the line relay 619, upon being energized, completes a circuit at armature 667 for the relay 612 and completes a circuit for the relay 617 at armature 666. The relay 617, upon being energized, opens the circuits of the relays 614 and 615 at armature 661, and at armature 662 prepares a circuit for the relay 618. The relay 614, upon being deenergized, opens one point in the circuit of the relay 615 at armature 655, and at armature 654 completes a circuit extending from the grounded conductor 691 by way of back contact and armature 654, armature 662 and its front contact, relay 618 and relay 617 to battery. The relay 618 is not energized so long as the original energizing circuit for the relay 617 is completed. The relay 615, upon being deenergized, prepares another point in the circuit of the line relay 616 at armature 658, prepares a point in the circuit of the relay 614 at armature 657 and at armature 656 prepares a counting relay chain circuit.

The relay 612, upon being energized, prepares a point in its locking circuit at armature 648, completes a circuit for the relay 611 at armature 649 and opens the locking circuit of the relay 613 at armature 647. The relay 613 is deenergized to establish a locking circuit for the relay 612 at armature 652, to open the circuit of the relay 610 at armature 653 and to remove ground from the conductor 685 at armature 650. The relay 611 operates to prepare a point in the circuit of the relay 600. The relay 610 is deenergized for the same purpose.

Another result of the operation of the relay 612 is that a circuit is completed which extends from ground by way of front contact and armature 646, armature 663 and its back contact, conductor 686, front contact and armature 727, armature 744 and its back contact, relay 712, back contact and armature 755, and back contact and armature 758 to battery. The relay 712 is energized over this circuit and operates to open the circuit of the selecting relay 511 at armature 742 and to complete a circuit for the relay 713. The circuit for the relay 713 is not effective so long as the original energizing circuit of the relay 712 is maintained.

The selecting relay 511, upon being deenergized, opens certain signalling circuits at springs 554 and 555, at springs 552 and 553 restores certain circuits to normal, and at spring 556 opens the circuit of the relay 800. The relay 800 is deenergized to open another point in the original energizing circuit of the relay 603 at armature 820, to prepare a point in the circuit of the relay 602 at armature 821, to disconnect the conductor 680 from the conductor 586 at armature 822 and to open the locking circuit of the relay 603 at armature 860.

The relay 603 is immediately deenergized to open the locking circuit of the relay 601, which is deenergized. The deenergization of the relay 601 completes a circuit which extends from ground by way of armature 624 and its back contact, relay 600, armature 644 and its back contact and front contact and armature 645 to battery.

The relay 600 is energized over the above circuit and operates to prepare one point in the circuit of the relay 601 at armature 623, to disconnect the trunk conductor 460 from the line relay 619 and to connect said conductor to the conductor 680. The disconnection of the trunk conductor 460 from the line relay 619 causes the deenergization of this relay. As a result of this operation, the short-circuit is removed from the relay 618 and this relay is permitted to energize.

As a result of the operation of the relay 618, another point in the original energizing circuit of the relay 617 is opened at armature 664 and the short-circuit is removed from the counting relay 713 at armature 663. As a result of the latter operation, the relay 713 is energized. Upon operating, the relay 713 prepares a point in the circuit of the relay 702 at armature 743, opens another point in the original energizing circuit of the relay 712 at armature 744, and at armature 745 completes a circuit extending from ground by way of armature 760 and its back contact, armature 730 and its back contact, armature 745 and its front contact, conductor 582, spring 564 and its working contact and selecting relay 512 to battery.

The selecting relay 512 is operated to prepare certain signalling circuits and to complete a circuit at spring 558 over a path which extends from ground by way of working contact and said spring, conductor 585 and relay 801 to battery. The relay 801 is energized to prepare a locking circuit for the relay 602 at armature 861, to connect the conductor 680 to the conductor 588 at armature 825 and to prepare a circuit at armature 824 for the relay 602.

A signalling circuit is now completed over a path which extends from the ungrounded brush of the generator 526 that creates an alternating current of 42 cycles, relay 517, front contact and armature 547, spring 557 and its working contact, conductor 588, front contact and armature 825, conductor 680, front contact and armature 622, trunk conductor 460, armature 428 and its front contact, conductor 277, front contact and armature 361, and relays 307 and 308 in multiple to ground.

As the relay 308 is the one that is tuned to respond to this particular frequency of alternating current, the armature 355 is operated to bring about the energization of the slow-acting relay 305. The relay 305, upon being energized, completes a circuit which extends from ground by way of back contact and armature 350, front contact and armature 347, working contact of spring 329 and said spring, conductor 164, armature 228 and its back contact and relay 207 to battery. The relay 207 is operated to attract the armature 237, thereby permitting the armatures 235 and 236 of the relay 205 to engage their resting contacts.

As a result of the operation of the armature 236, a circuit is completed for the relay 203 and this relay is operated to prepare a circuit for the relay 205 at armature 228 and to open a point in the circuit of the relay 204 at armature 229.

Another result of the operation of the relay 207 is that a circuit is completed for the relay 206 at armature 238. The relay 206 operates to attract the armature 232, thereby permitting the armatures 230 and 231 of the relay 204 to engage their resting contacts. As a result of the operation of the armature 230, ground from key K—1 is placed upon the conductor 166. The operation of the relay 203 also opens the circuit of the relay 207, which is deenergized, and opens the circuit of the relay 206, which is also deenergized.

Another result of the operation of the relay 305 is that a circuit is completed extending from ground by way of armature 349 and its back contact, front contact and armature 346, armature 360 and its back contact, armature 363 and its front contact, conductor 287, and relay 402 to battery. The relay 402 is energized to establish a locking circuit for itself at armature 456, to complete a circuit for the relay 401 at armature 423 and to complete a circuit for the relay 404 over a path which extends from ground by way of armature 429 and its front contact, armature 422 and its front contact, back contact and armature 425, relay 404, armature 424 and its back contact, and front contact and armature 421 to battery.

The relay 401 is energized to open the locking circuit of the relay 400 at armature 420 and to prepare a locking circuit for itself at armature 419. The relay 400, upon being deenergized, opens the circuit of the relay 406 at armature 417 and at the back contact of this armature completes a locking circuit for the relay 401. The relay 404, upon operating, establishes a locking circuit for itself at armature 427 and, at the back contact of this armature, opens the circuit of the relay 405, which is deenergized. As a result of the deenergization of the relay 405, one point in the circuit of the relays 317 and 318 is opened at armature 430, at armature 429 one point in the original energizing circuit of the relay 404 is opened, and at armature 428 the trunk conductor 460 is disconnected from the relays 307 and 308 and connected to conductor 274.

Another result of the operation of the relay 305 is that a circuit is completed extending from ground by way of armature 349 and its back contact, front contact and armature 346, conductor 298, and slow-acting relay 218 to battery. The slow-acting relay 218 is energized to open one point in the circuit of the line relay 410.

At the substation, the alternating-current relay 517 is energized in series with the relay 308. A circuit is now completed extending from ground by way of armature 545 and its front contact, armature 548 and its back contact, and relay 520 to battery. The relay 520, upon operating, completes a circuit which extends from ground by way of front contact and armature 621, conductor 672, armature 551 and its front contact, relay 519 and relay 520 to battery, and at armature 593 completes a circuit extending from ground by way of said armature and its front contact, conductor 693 and slow-acting relay 803 to battery.

Now, when the relay 405 at the dispatcher's office is energized, as before described, the circuit of the alternating-current relay 517 is opened and this relay is deenergized to remove the short-circuit from the relay 519, which is energized. The relay 519, upon operating, opens another point in the original energizing circuit of the relay 520 at armature 548, and at armature 549 completes a circuit extending from ground by way of front contact and said armature, conductor 671, back contact and armature 821, front contact and armature 824, conductor 682, and relay 602 to battery.

The relay 602, upon being energized, establishes a locking circuit for itself at armature 697, over a path extending from ground by way of front contact and armature 861, conductor 684, armature 697 and its front contact and relay 602 to battery, and at armature 625 completes a circuit extending from ground by way of front contact and said armature, conductor 676 and relay 805 to battery.

The relay 805 is energized over the above circuit and operates to prepare a locking circuit for itself at armature 833 and to open the locking circuit of the relay 804 at armature 832. The relay 804 is deenergized to establish a locking circuit for the relay 805 and to open the circuit of the relay 620 by removing ground from conductor 688. The relay 620 is deenergized to prepare a circuit for the line relay 616.

Another result of the operation of the relay 602 is that at armatures 626 and 627 a circuit is completed for the relay 601. The relay 601 operates to establish a locking circuit for itself at armature 624 and opens the circuit of the relay 600 at the back contact of this armature. The relay 600 is deenergized to open one point in the circuit of the relay 601 at armature 623, to disconnect the trunk conductor 460 from the conductor 680 and connect it to the conductor 689 at armature 622, and to open the circuits of the relays 519 and 520 at armature 621. The relay 519 is deenergized to open the original energizing circuit of the relay 602 at armature 549, and to prepare a circuit for the relay 520 at armature 548. The relay 520 is deenergized to open the circuit of the slow-acting relay 803 at armature 593 and to open another point in the circuit of the relay 519 at armature 551.

The slow-acting relay 218 at the dispatcher's office is deenergized after an interval to prepare one point in the circuit of the line relay 410. When the slow-acting relay 803 at the substation is deenergized, a circuit is completed which extends from the positive pole of the battery B, back contact and armature 443, line relay 410, back contact and armature 431, conductor 276, back contact and armature 268, front contact and armature 267, conductor 274, back contact and armature 428, trunk conductor 460, armature 622 and its back contact, conductor 689, armature 838 and its front contact, armature 829 and its back contact, conductor 687, armature 668 and its back contact, line relay 616, armature 658 and its back contact, to the negative pole of the battery B—1, and thence to ground. The line relays 410 and 616 at the dispatcher's office and substation, respectively, are now energized in series.

In order to facilitate the explanation of the operation of the system, let us revert to the initiation of its operation by the dispatcher. It will be assumed that the dispatcher does not operate the key K—1, but another key, in order to operate another apparatus unit similar to the circuit breaker C. Under these conditions, the key K—1 will be in a position opposite to that shown and the relay 204 will be energized.

Now, when the selecting relays 313 and 511 at the dispatcher's office and substation, respectively, are energized by the operation of the control circuits in a manner described, there will be no current flow over the signalling circuit from either of the generators 219 or 220 by reason of the fact that the key K—1 is in the wrong position to cause an operation. However, there will be a circuit operation completed at the dispatcher's office extending from ground by way of spring 250 of key K—1 and its working contact, front contact and armature 230, conductor 166, spring 331 and its working contact and relay 316 to battery.

The relay 316 is energized to complete a signalling circuit which extends from the ungrounded brush of the 66-cycle generator 221, winding of alternating-current relay 202, conductor 270, armature 365 and its front contact, front contact and armature 364, armature 358 and its front contact, conductor 277, front contact and armature 428, trunk conductor 460, armature 680, armature 822 and its front contact, conductor 586, and relays 500 to 502, inclusive, in multiple to ground. The relay 500 is the only one that is tuned to respond to an alternating current having a frequency of 66 cycles.

The operation of the relay 500 causes the energization of the slow-acting relay 508. The relay 508, upon being operated, places ground upon the conductor 693 at armature 590 and places ground upon the conductor 587 at armature 537. The grounding of conductor 693 brings about the energization of the slow-acting relay 803. The relay 803 operates to open one point in the circuit of the line relay 619. The grounding of conductor 587 completes a circuit extending by way of armature 823 and its back contact, front contact and armature 820, conductor 678, and relay 603 to battery.

The relay 603 is energized to complete a locking circuit for itself which extends from ground by way of front contact and armature 860, conductor 683, armature 698 and its front contact and relay 603 to battery, and at armature 628 completes a circuit which extends from ground by way of front contact and said armature, conductor 677, and relay 804 to battery. The relay 804 is energized to establish a locking circuit for itself at armature 830, to open one point in the locking circuit of the relay 805 at armature 831 and to complete a circuit which extends from ground upon grounded conductor 691, armature 831 and its front contact, conductor 688 and relay 620 to battery. The relay 620 is energized to prepare a circuit for the line relay 619.

Another result of the operation of the relay 603 is that a circuit is completed, at armatures 629 and 630, for the relay 601 over a path which extends from ground by way of armature 623 and its front contact, armature 630 and its front contact, back contact and armature 627, relay 601, armature 626 and its back contact, and front contact and armature 629 to battery.

The relay 601 operates to establish a locking circuit for itself at armature 624 and, at the back contact of this armature, opens the circuit of the relay 600. The relay 600 is deenergized to open the original energizing circuit of the relay 601 at armature 623, to open one point in the circuits of the relays 519 and 520 at armature 621, and to transfer the trunk conductor 460 at armature 622 from connection with the relays 500 to 502, inclusive, to the control circuit. The control circuit still remains open, of course, by reason of the continued energization of the slow-acting relay 803. The transfer of the trunk conductor previously mentioned opens the circuit of the pendulum relay 500, which ceases to operate. After a short interval of time, the slow-acting relay 508 is deenergized and the original energizing circuit of the relay 603 is opened, as well as the energizing circuit of the slow-acting relay 803. The relay 603 is not deenergized at the present time by reason of its locking circuit previously mentioned.

At the dispatcher's office, the relay 202 is energized in series with the relay 500. The relay 202, upon being operated, completes a circuit for the slow-acting relay 218 at armature 227 and at armature 226 completes a circuit extending from ground by way of said armature and its front contact, conductor 271, armature 367 and its back contact, and relay 317 to battery. The relay 317, upon being energized, operates to complete a circuit extending from ground by way of armature 430 and its front contact, conductor 280, armature 366 and its front contact, relay 318 and relay 317 to battery. The relay 318 is not energized by reason of the fact that it is short-circuited as long as the original energizing circuit for the relay 713 is maintained.

When the trunk conductor 460 is transferred at the substation, as previously described, the circuit of the alternating-current relay 202 is opened and this relay is deenergized to remove the short-circuit from the winding of the slow-acting relay 318. The relay 318 is energized to open another point in the original energizing circuit of the relay 317 at armature 367 and to complete a circuit extending from ground by way of front contact and armature 368, back contact and armature 362, front contact and armature 359, conductor 278 and relay 403 to battery.

The relay 403 is energized to establish a locking circuit for itself at armature 457 over a path extending from ground by way of armature 379 and its front contact, conductor 282, armature 457 and its front contact and relay 403 to battery. The operation of the relay 403 at armature 426 completes a circuit for the relay 400. The relay 400 is energized to complete a locking circuit for itself at armature 418, to open one point in the locking circuit of the relay 401 at armature 417, and to complete a circuit for the relay 406 at the front contact of this armature. The relay 406 is energized to prepare one point in the circuit of the line relay 407.

Another result of the operation of the relay 403 is that a circuit is completed extending from ground by way of armature 429 and its front contact, armature 422 and its back contact, front contact and armature 425, relay 404, armature 424 and its front contact and back contact and armature 421 to battery. The relay 404 is energized to establish a locking circuit for itself at armature 427 and to open the circuit of the relay 405 at the back contact of this armature.

The relay 405 is deenergized to transfer the trunk conductor 460 back to the control circuit. Other results of the deenergization of the relay 405 are that one point in the original energizing circuit of the relay 404 is opened at armature 429 and the circuit of the relays 317 and 318 is opened at armature 430. The relay 317 is deenergized to open another point in the circuit of the relay 318. The relay 318 is deenergized to prepare a point in the circuit of the relay 317 and to open the previously traced circuit for the relay 403. The operation now proceeds in the same manner as before described.

Whenever a control signal is sent, that is, whenever the dispatcher desires to operate a particular apparatus unit and this apparatus unit is selected, alternating current from one of the generators 219 or 220 is applied to the trunk circuit. In the event that no operation is desired to be performed by the dispatcher, the switching operation is controlled by the application of alternating current from the generator 221 to the trunk circuit. In other words, whenever an apparatus unit is selected, it must either be controlled by the application of one of the control frequencies or the switching frequency must be applied to the trunk circuit.

The circuit for this switching frequency is completed from ground through generator 221, winding of relay 202, conductor 270, armature 365 and its front contact, front contact and armature 364, armature 358 and its front contact, conductor 277, front contact and armature 428, trunk line 460, armature and front contact 622, conductor 680, armature 822 and its front contact, conductor 586 and alternating current relay 500 to ground. Operation of armature 527, as a result of the energization of relay 500, will complete an obvious energizing circuit for relay 508.

Energization of relay 508 opens both tripping and closing operation circuits at armatures 535 and 536. At armature 590 a circuit is completed from ground, armature 590 and its front contact, conductor 693, winding of relay 803, battery to ground. Energization of relay 803 opens the circuit of the drive relays 660 and 690 at armature 829.

At armature 537 a circuit is completed from ground through armature 537 and its front contact, conductor 587, armature 823 and its back contact, front contact and armature 820, conductor 678, winding of relay 603, battery and ground. Energization of relay 603 completes an energizing circuit for the relay 601 from ground, battery, armature 629 and its front contact, back contact and armature 626, winding of relay 601, armature 627 and its back contact, front contact and armature 630, front contact and armature 623 to ground. Energization of relay 601 completes an energizing circuit for itself from ground, battery, armature 629 and its front contact, back contact and armature 626, winding of relay 601, front contact and armature 624 to ground and the energizing circuit for the relay 600 is opened at the back contact of armature 624. Deenergization of relay 600 causes its armature to drop to its back position and connects the trunk line 460 to the drive circuit. The operation from thereon continues in the manner already described.

Referring now to the operation of the system under the conditions first assumed, it will be remembered that the line relays 410 and 616 are energized. The operation of the line relay 410 completes circuits for the relays 412 and 413. The relay 412 operates to open the circuits of the relays 408 and 409 and to prepare a circuit for the relay 411. The relay 413 is operated to open the locking circuit of the relay 414, to prepare a locking circuit for itself and to complete a circuit for the relay 416. The relay 414 is deenergized to complete a locking circuit for the relay 413 and to open the circuit of the relay 415. The relay 415 is deenergized to prepare one point in the circuit of the relay 405. The relay 416 is energized for the same purpose. Another result of the operation of the relay 413 is that a circuit is completed for the counting relay 109.

The counting relay 109 is energized to prepare a circuit for the relay 108 and to open the circuit of the selecting relay 312. The relay 312 is deenergized to open certain points in the signalling circuits and to open the circuit of the relay 315. The relay 315 is deenergized to disconnect the relays 307 and 308 from the conductor 277 at armature 361, and to open the locking circuit of the relay 402 at armature 380.

The relay 402 is deenergized to bring about the deenergization of the relay 404. The latter relay retracts its armature to complete a circuit for the relay 405. The relay 405 opens the circuit of the line relay 410 at armature 428, and at the front contact of this armature prepares a signalling circuit. As a result of the circuit of the line relay 410 being opened, this relay is deenergized to permit the energization of the relay 411. The relay 411 operates to remove the short-circuit from the counting relay 108, thus permitting this relay to be energized.

As a result of the operation of the relay 108, a circuit is completed extending from ground by way of back contact and armature 158, armature 153 and its back contact, armature 136 and its front contact, conductor 179, spring 340 and its working contact and selecting relay 311 to battery. The selecting relay 311 is energized to prepare certain signalling circuits and to complete a circuit for the relay 314. The relay 314 is energized to prepare a control circuit at armature 358 and to prepare a locking circuit for the relay 403 at armature 379.

At the substation, the line relay 616 operates to complete circuits for the relays 614 and 613. The relay 614 operates to open the circuits of the relays 617 and 618 at armature 654 and to prepare a circuit for the relay 615. The relay 613 operates to prepare a locking circuit for itself at armature 651, to complete a circuit for the relay 610 at armature 653 and to open the circuit of the relay 612 at armature 652. The relay 612 is deenergized to complete the locking circuit of the relay 613 and to open the circuit of the relay 611. The relay 611 is deenergized to prepare one point in the circuit of the relay 600 and the relay 610 is energized for the same purpose.

Another result of the operation of the relay 613 is that a circuit is completed for the counting relay 702. The relay 702 is energized to prepare a circuit for the relay 703 and to open the circuit of the selecting relay 512. The relay 512 is deenergized to open the circuit of the relay 801. The relay 801 is deenergized to open the locking circuit of the relay 602 which retracts its armatures. As a result of this operation, the relay 601 is deenergized to complete a circuit for the relay 600. The relay 600 operates to open the circuit of the line relay 616 and to complete a signalling circuit at armature 622.

When the circuit of the line relay 616 is opened, this relay is deenergized to permit the energization of the relay 615. The relay 615 operates to remove the short-circuit from the counting relay 703. The counting relay 703 is operated to prepare a circuit for the relay 714 at armature 721, and to complete a circuit extending from ground by way of back contact and armature 760, armature 746 and its back contact, armature 733 and its front contact, conductor 581, spring 565 and its working contact and selecting relay 513 to battery. The selecting relay 513 is energized to prepare certain signalling circuits and to place ground upon the conductor 584. The grounding of conductor 584 causes the energization of the relay 800. The relay 800 is energized to prepare a locking circuit for the relay 603 at armature 860 and to complete a signalling circuit at armature 822.

If the key associated with the particular apparatus unit that is selected has been operated into a new position by the dispatcher, alternating current from one of the generators 219 or 220 will be applied to the signalling circuit and the apparatus will function in the same manner as before described. In the event that the position of the key has not been changed by the dispatcher, signalling current from the generator 221 will be applied to the signalling circuit and the apparatus will function in the same manner as before. In either event, the switch-over is brought about and the trunk circuit is switched to the line relays.

The line relays 407 and 410 at the dispatcher's office are now alternately operated over the control circuit in the manner described.

By these operations, the counting relays 115, 114, 105, 104, 117, 116, 107, 106, 119, 118, 109, 108, 121, 120, 111 and 110 are energized in the sequence mentioned. The selecting relays 310, 309, 304, 303, 302, 301 and 300 are also energized in the sequence mentioned. Of course, it will be understood that the trunk circuit is alternately switched between the line relays and the signalling circuits in the same manner as before described.

At the substation, the line relays 619 and 616 are alternately operated by the control circuit in the same manner as before. The counting relays 714, 715, 704, 705, 716, 717, 706, 707, 708, 709, 720, 721, 710 and 711 are energized by the operation of the control circuit in the sequence mentioned. The selecting relays 514, 515, 503, 504, 505, 506 and 507 are energized by the operation of the counting relays. The trunk circuit at the substation is also switched alternately between the control circuit and the signaling circuit. By this means, the control and signaling operations, as well as the selective operations, are performed over a single pair of wires.

At the dispatcher's office, the relays 410 and 413 are operated to bring about the energization of the counting relay 101. The counting relay 101 is energized to open the circuit of the selecting relay 300, which is deenergized. As a result of the deenergization of the relay 300, certain signaling circuits are opened and the circuit of the relay 315 is opened. The relay 315 is deenergized to open the locking circuit of the relay 402. The relay 402 is deenergized to open the locking circuit of the relay 404. The relay 404 is deenergized to complete a circuit for the relay 405. The relay 405 disconnects the trunk conductor 460 from the control circuit and connects it to the signaling circuit.

As a result of the opening of the control circuit, the line relay 410 is deenergized and the short-circuit is removed from the relay 411. The relay 411 is operated to remove the short-circuit from the relay 100, which is energized. As a result of the operation of the relay 100, a circuit is prepared for the counting relay 113 and a circuit is completed extending from ground by way of back contact and armature 158, armature 145 and its back contact, armature 128 and its front contact, conductor 171 and relay 322 to battery.

The relay 322 is energized to complete a circuit for the relay 314 at armature 344 and to complete a circuit which extends from ground by way of armature 345 and its front contact, armature 373 and its back contact, relay 324, armature 378 and its back contact, and back contact and armature 369 to battery. The relay 324 is operated to open the circuit of the switching relay 319 at armature 371 and to complete a circuit which extends from ground by way of armature 242 and its back contact, conductor 273, armature 372 and its front contact, relay 325, relay 324, armature 378 and its back contact and back contact and armature 369 to battery. The relay 325 is not energized at this time so long as the original energizing circuit of the relay 324 is maintained. The switching relay 319 is deenergized to disassociate the first group of selecting relays from the control of the counting relays 100 to 123, inclusive.

The relay 314 is energized to prepare a point in the locking circuit of the relay 403 at armature 379 and to prepare a point in the circuit of conductor 460 at armature 358. Another result of the operation of the relay 314 is that a circuit is completed extending from ground by way of armature 382 and its front contact, back contact and armature 362, front contact and armature 359, conductor 278, and relay 403 to battery.

The relay 403 is energized to establish a locking circuit for itself at armature 457, to complete a circuit for the relay 400 at armature 426 and to complete a circuit for the relay 404 at armatures 424 and 425. The relay 400, upon being energized, opens the locking circuit of the relay 401 at armature 417, at the front contact of this armature completes a circuit for the relay 406 and at armature 418 prepares a locking circuit for itself. The relay 401, upon being deenergized, establishes a locking circuit for the relay 400 at armature 420. The relay 404, upon being energized, opens the circuit of the relay 405 and this relay is deenergized to disconnect the trunk conductor 460 from the conductor 277 and connects it to the conductor 274.

Referring now to the operation of the apparatus at the substation, the counting relay 710 is energized by the operation of the line relay 616, bringing about the operation of the relay 613. The relay 710, upon being energized, opens the circuit of the selecting relay 507 at armature 738, and at the front contact of this armature prepares a circuit for the relay 711, which is effective when the original energizing circuit of the relay 710 is opened.

The selecting relay 507, upon being deenergized, restores certain signaling circuits to normal and opens the circuit of the relay 801 by removing ground from conductor 585. The relay 801 is deenergized to open the locking circuit of the relay 602. The relay 602 is deenergized to open the locking circuit of the relay 601. The latter relay retracts its armature to complete a circuit for the relay 600. The relay 600 is energized to disconnect the trunk conductor 460 from the conductor 689, to connect it to the conductor 680 at armature 622 and to prepare a circuit for the relay 601 at armature 623.

As a result of the disconnection of the trunk conductor, the circuit of the line relay 616 is opened and this relay is deenergized to permit the energization of the relay 615, which is energized to remove the short-circuit from the relay 711, thus permitting this relay to operate. The relay 711 operates to open another point in the original energizing circuit of the relay 710 at armature 740, to prepare a circuit for the counting relay 722 at armature 739, and to complete a circuit extending from ground by way of back contact and armature 760, armature 754 and its back contact, armature 741 and its front contact, conductor 573 and relay 521 to battery.

The relay 521 is energized to place ground upon the conductor 584 at armature 560, to place ground upon the conductor 587 at armature 591, and to complete a circuit at armature 561 extending from ground by way of conductor 674, armature 633 and its back contact, relay 604, back contact and armature 638 and back contact and armature 640 to battery.

The relay 604 is energized over the above circuit and operates to open the circuit of the switching relay 524 at armature 631 and to complete a circuit at armature 632 which extends from ground by way of back contact and armature 643, armature 632 and its front contact, relay 605, relay 604, back contact and armature 638 and back contact and armature 640 to battery. This circuit is not effective as long as the original energizing circuit of the relay 604 is maintained.

As a result of the opening of the circuit of the relay 524, this relay is deenergized to disconnect the selecting relays 503 to 507, inclusive, and relays 511 to 515, inclusive, from connections with the counting relays 700 to 723, inclusive. The placing of ground upon conductor 584, by the operation of the relay 521, brings about the operation of the relay 800. This relay is energized to prepare a locking circuit for the relay 603 at armature 860 and to complete a circuit which extends from grounded conductor 587, which has been previously grounded by the operation of the relay 519, armature 823 and its back contact, front contact and armature 820, conductor 678 and relay 603 to battery.

The relay 603, upon being energized, establishes a locking circuit for itself at armature 698, completes a circuit for the relay 804 at armature 628, and at armatures 629 and 630 completes a circuit for the relay 601.

The relay 804, upon being energized, opens the locking circuit of the relay 805 at armature 831, at the front contact of this armature completes a circuit for the relay 620, and at armature 830 prepares a locking circuit for itself. The relay 805 is deenergized to complete a locking circuit for the relay 804.

The relay 601 is energized to establish a locking circuit for itself at armature 624 and to open the circuit of the relay 600 at the back contact of this armature. The relay 600 operates to disconnect the trunk conductor 460 from the conductor 680 and to connect it to the conductor 689.

The control circuit is now completed and the line relays 407 and 619 are energized over a path which extends from the negative pole of the battery B, back contact and armature 436, line relay 407, front contact and armature 431, conductor 276, back contact and armature 268, front contact and armature 267, conductor 274, back contact and armature 428, conductor 460, armature 622 and its back contact, conductor 689, armature 838 and its front contact, armature 829 and its back contact, conductor 687, armature 668 and its front contact, line relay 619, armature 665 and its back contact to the positive pole of the battery B—1, and thence to ground.

The relay 407 at the dispatcher's office is operated to complete a circuit for the relays 409 and 414. The relay 409 is energized to open the circuits of the relays 411 and 412 and to prepare a circuit for the relay 408. The relays 411 and 412 are deenergized to prepare certain circuits. The relay 414 is operated to open the locking circuit of the relay 413, to prepare a locking circuit for itself and to complete a circuit for the relay 415. The relay 413 is deenergized to complete a locking circuit for the relay 414 and to complete a circuit for the relay 416. The operation of the relays 415 and 416 prepares a circuit for the relay 405.

Another result of the operation of the relay 414 is that a circuit is completed for the counting relay 113. The counting relay 113 is energized to open the circuit of the relay 322 at armature 145 and to prepare a circuit for the relay 112. The relay 322 is deenergized to open the circuit of the relay 314 and also the original energizing circuit of the relay 324 at armatures 344 and 345. The relay 314 is deenergized to open the locking circuit of the relay 403.

When the original energizing circuit of the relay 324 is opened, the short-circuit is removed from the relay 325 and this relay is permitted to energize. As a result of this operation, a circuit is completed extending from ground by way of back contact and armature 375, front contact and armature 374 and switching relay 320 to battery. The relay 320 is energized to connect the second group of selecting relays under the control of the counting relays.

The relay 403 is deenergized to open the locking circuit of the relay 404, which is deenergized. By the retraction of the armature 427 of the relay 404, the relay 405 is energized and the circuit of the line relay 407 is opened. The relay 407 is deenergized to remove the short-circuit from the relay 408, which is thus permitted to deenergize.

As a result of the above operation, the short-circuit is removed from the counting relay 112 and this relay is operated. The relay 112, upon operating, removes the short-circuit from the winding of the relay 125 at armature 142 and the relay 125 is energized in series with the counting relays. Another result of the operation of the relay 112 is that, at armature 144, a circuit is completed extending from ground by way of said armature and its front contact, conductor 170, and relay 321 to battery.

The relay 321 is energized to complete a circuit for the relay 315 at armature 343 and to complete a circuit, at armature 381, which extends from ground by way of said armature and its front contact, conductor 298, and slow-acting relay 218 to battery. The relay 315, upon being energized, prepares a locking circuit for the relay 402 at armature 380, and at armature 363 completes a circuit extending from ground by way of armature 381, and its front contact, armature 360 and its back contact, armature 363 and its front contact, conductor 267, and relay 402 to battery.

The relay 402 is energized to establish a locking circuit for itself at armature 456 and to complete a circuit for the relay 404 at armatures 421 and 422. The relay 401 is energized to prepare a locking circuit for itself at armature 419 and to open the circuit of the relay 400 at armature 420. The relay 400 is deenergized to open the circuit of the relay 406. The relay 406 retracts its armature to prepare a circuit for the line relay 410. The relay 404 is operated to establish a locking circuit for itself at armature 427 and to open the circuit of the relay 405 at the back contact of this armature. The relay 405 is deenergized to prepare one point in the control circuit.

At the substation, the line relay 619 is operated to complete a circuit for the relay 612. The latter relay operates to complete a circuit for the counting relay 722. The relay 722 is energized to open the circuit of the relay 521 at armature 754 and to complete a circuit for the relay 723 at the front contact of this armature. The relay 521 is deenergized to open the circuit of the relay 800 at armature 560 and to open the original energizing circuit of the relay 603 at armature 561. Another result of the deenergization of the relay 521 is that the short-circuit is removed from the relay 605. This relay is operated to prepare a circuit for the relay 606 at armature 633 and to complete a circuit extending from ground by way of armature 634 and its front contact, armature 635 and its back contact, conductor 675, and switching relay 523 to battery. The switching relay 523 is operated to connect the second group of selecting relays under the control of the counting relays 700 to 723, inclusive.

The relay 800 is deenergized to open the locking circuit of the relay 603. The relay 603 is deenergized to open the locking circuit of the relay 601. The relay 601 retracts its armature to complete a circuit for the relay 600. The relay 600 operates to open the circuit of the line relay 619 which is deenergized to remove the short-circuit from the relay 618. The relay 618 operates to remove the short-circuit from the relay 723. The relay 723 is operated to remove the short-circuit from the relay 724, thus permitting this relay to be energized in series with the counting relays at armature 755, and at armature 757 to complete a circuit which extends from ground by way of said armature and its front contact, conductor 572 and relay 522 to battery.

The relay 522 is operated to prepare a circuit for the relay 602 at armature 592 and to complete a circuit at armature 562 over conductor 585 for the relay 801. The relay 801 is operated to prepare a locking circuit for the relay 602 and to complete a circuit which extends from ground upon conductor 671, which has been grounded by the operation of the relay 522, back contact and armature 821, front contact and armature 824, conductor 682 and relay 602 to battery. The relay 602 is energized to establish a locking circuit for itself at armature 797 and to complete a circuit for the relay 805 at armature 625 and to complete a circuit for the relay 601.

The relay 805 is energized to open the circuit of the relay 804 and to prepare a locking circuit for itself. The relay 804 is deenergized to open the circuit of the relay 620 and to establish a locking circuit for the relay 805. The relay 620 is deenergized to prepare a circuit for the relay 616. The relay 601 is operated to open the circuit of the relay 600. The relay 600 is deenergized to reestablish one point in the control circuit.

At the dispatcher's office, it will be remembered that the relay 125 is energized in series with the counting relays. The relay 125, upon operating, opens one point in the battery supply circuit of the counting relays at armature 160, and at armature 161 completes a circuit for the slow-acting relay 124. The slow-acting relay 124 operates to open the circuits of the counting relays 100 to 123, inclusive, at armature 158, and at armature 159 disconnects ground from the conductor 163 and connects it to the conductor 162. Thus, all the counting relays are restored to normal.

The deenergization of the counting relay 112 opens the circuit of the relay 321. This relay is deenergized to open the circuit of the relay 315. The relay 315 is deenergized to open the circuit of the relay 403. The relay 403 is deenergized to open the circuit of the relay 404.

The disconnection of ground from the conductor 163 brings about the release of the relays 408 and 409, the relay 414 and the relay 401. The relays 408 and 409 are deenergized to restore certain circuits to normal. The relay 414 is deenergized to open the circuit of the relay 416, which is deenergized. The relay 401 is deenergized to restore certain circuits to normal.

The connection of ground to the conductor 162 brings about the energization of the relay 210. The relay 210 operates to establish a locking circuit for itself at armature 253, to open the circuits of the relays 212 and 213 at armature 254, and to open the circuit of the relay 217 at armature 255. The relay 217 is deenergized to prepare one point in the circuit of the holding relay 216 at armature 267 and to open the original energizing circuit of the relay 208 at armature 266. The relay 212 is deenergized to open one point in the circuit of the relay 213 and to open the circuit of the relay 214. The relay 214 is deenergized to prepare one point in the circuit of the relay 212. The relay 213 is deenergized to prepare another point in the circuit of the relay 212 and to prepare another point in the circuit of the holding relay 216 at armatures 260 and 261, respectively.

At the substation, the relay 724 is operated to complete a circuit for the slow-acting relay 725. The relay 725, upon being energized, opens the circuits of all the counting relays 700 to 723, inclusive, at armature 760, and at armature 761 removes ground from conductor 691 and connects ground to conductor 692. The removal of ground from conductor 691 brings about the deenergization of the relays 612, 617, 618 and 805. The relay 805 is deenergized to restore certain circuits to normal. The relay 612 is deenergized to open the circuit of the relay 611. The relays 617 and 611 are deenergized to restore certain circuits to normal.

The counting relays 700 to 723, inclusive, are released by the operation of the slow-acting relay 725. The release of the counting relay 723 brings about the deenergization of the relay 522. The relay 522 retracts its armature to open the circuit of the relay 800. The relay 800 is deenergized to open the circuit of the relay 602. The relay 602 retracts its armature to open the circuit of the relay 601.

The grounding of conductor 692 by the operation of the relay 725 brings about the energization of the relay 819 which operates to establish a locking circuit for itself, to open the circuits of the relays 816 and 817 and to open the circuit of the relay 809 at armatures 856, 857 and 859, respectively.

The relay 809 is deenergized to prepare one point in the circuit of the holding relay 810. The relay 817 is deenergized to open the circuit of the relay 815. The relay 815 retracts its armature to prepare one point in the circuit of the relay 817. The relay 816 is deenergized to reestablish the original holding circuit over a path which extends from battery by way of back contact and armature 261, holding relay 216, back contact and armature 267, conductor 274, back contact and armature 428, trunk conductor 460, armature 622, and its back contact, conductor 689, armature 838 and its back contact, relay 810 and armature 850 and its back contact to ground.

The relay 216 is energized to complete a circuit for the relay 211 at armature 264 and to prepare a circuit for the relay 215 at armature 265. The relay 211 is energized to open the locking circuit of the relay 210 at armature 256. The relay 210 is deenergized to complete a circuit which extends from ground by way of back contact and armature 255, armature 265 and its front contact and relay 215 to battery.

The relay 215 is energized to complete a circuit extending from ground by way of front contact and armature 241, front contact and armature 263, back contact and armature 262, armature 260 and its back contact, and relay 212 to battery. The relay 212 is energized to complete a circuit for the relay 213 at armature 258 and to complete a circuit for the relay 214 at armature 259. The relay 214 operates to open the original energizing circuit of the relay 212, thereby removing the short-circuit from the relay 213 and permitting this relay to operate. The relay 213 operates to open the circuits of the relays 216 and 810.

At the substation, the relay 810 is energized to complete a circuit for the relay 818 at armature 839. The relay 818 is energized to open the circuit of the relay 819. The latter relay retracts its armature to establish a circuit extending from ground by way of back contact and armature 858, armature 840 and its front contact, and relay 811 to battery. The relay 811 is energized to complete a circuit extending from ground by way of armature 828 and its front contact, armature 841 and its front contact, back contact and armature 848, and relay 817 to battery. The relay 817 is energized to prepare a circuit for the relay 816 at armature 851, and to complete a circuit for the relay 815 at armature 852. The relay 816 operates to open one point in the circuit of the relay 810.

The control circuit at both the dispatcher's office and substation now begins to function in the same manner as before described, and the counting relays and the selecting relays not shown are operated in the proper sequence. The control and signalling operations take place as before.

When the counting relay 100 at the dispatcher's office is operated by the control circuit in the manner previously described, a circuit is completed for the relay 322. The relay 322 is energized to complete a circuit for the relay 314 at armature 344 and to complete a circuit extending from ground by way of aramature 345 and its front contact, armature 373 and its front contact, armature 377 and its back contact, relay 326, armature 378 and its back contact, and back contact and armature 369 to battery. The relay 326 is energized to open the circuit of the switching relay 320 at armature 375 and to complete a circuit for the relay 327 at armature 376. The switching relay 320 is deenergized to disconnect the second group of selecting relays not shown from the control of the counting relays.

The relay 314 is energized to complete a circuit for the relay 403. The relay 403 operates to complete the circuit of the relay 404. The relay 404 is energized to open the circuit of the relay 405. The relay 403 also completes a circuit for the relay 400. The relay 400 is energized to complete a circuit for the relay 406. The relay 406 operates to prepare a circuit for the line relay 407. The relay 405 is deenergized to complete one point in the control circuit.

At the substation, when the counting relay 711 is operated, a circuit is completed for the relay 521. The relay 521, upon operating, completes a circuit for the relay 800 at armature 560 and completes a circuit which extends from ground by way of armature 561 and its front contact, conductor 674, armature 633 and its front contact, armature 637 and its back contact, relay 606, back contact and armature 638 and back contact and armature 640 to battery.

The relay 606 is energized to open the circuit of the switching relay 523 at armature 635, and to complete a circuit for the relay 607 which is effective when the original energizing circuit for the relay 606 is opened. The relay 523 is energized to disconnect the second group of selecting relays from the control of the counting relays.

The relay 800 is energized to complete a circuit for the relay 603. The relay 603 operates to complete a circuit for the relay 601 and also for the relay 804. The relay 804 operates to open the circuit of the relay 805 and to complete a circuit for the relay 620. The relay 620 is energized to prepare a circuit for the line relay 619. The relay 601 is operated to open the circuit of the relay 600. The relay 600 is deenergized to complete the control circuit.

The line relays 407 and 619 are now energized in series and the counting relay 113 at the dispatcher's office is energized to prepare a circuit for the relay 112 and to open the circuit of the relay 322. The relay 322 is deenergized to open the circuit of the relay 314 and to remove the short-circuit from the winding of the relay 327. The relay 327 is energized to remove the short-circuit from the relay 323. The relay 323 is energized to complete a circuit extending from ground by way of armature 370 and its front contact, conductor 275, and relay 209 to battery.

The relay 209 operates to establish a locking circuit for itself at armature 244, to open the locking circuit of the relay 208 at armature 243 and to remove ground from the conductor 273 at armature 242. The removal of ground from the conductor 273 brings about the release of the relays 324 to 327, inclusive.

By the deenergization of the relay 314, the circuit of the relay 402 is opened and this relay is deenergized to permit the relay 404 to be deenergized. The relay 404 retracts its armature to complete a circuit for the relay 405. The relay 405 operates to open the circuit of the line relay 407 at armature 428. The relay 407 is deenergized to remove the short-circuit from the relay 408. The relay 408 is operated to remove the short-circuit from the relay 112. The relay 112 operates to remove the short-circuit from the relay 125 at armature 142, and at armature 144 completes a circuit for the relay 321. The relay 321 operates to complete a circuit for the relay 315 at armature 343, and at armature 381 completes a circuit for the slow-acting relay 218. The relay 218 operates to open one point in the control circuit.

The operation of the relay 315 follows as a result of the energization of the relay 321. The relay 315 is energized to complete a circuit for the relay 402. The relay 402 attracts its armatures to establish a locking circuit for itself, to complete a circuit for the relay 401 and to complete a circuit for the relay 404. The relay 404 is energized to open the circuit of the relay 405, and this relay is deenergized to complete a point in the holding circuit.

The relay 125 is energized by reason of the operation of the counting relay 112. The relay 125 operates to complete a circuit for the relay 124. The relay 124 is energized to open the circuits of all the counting relays 100 to 123, inclusive, at armature 158 and to remove ground from the conductor 163 and place ground upon conductor 162 at armature 159. The removal of ground from the conductor 163 brings about the release of certain circuits in a manner previously described.

When the relay 112 is released, the relay 321 is deenergized and the relay 315 retracts its armatures. As a result of this operation, the relay 403 is deenergized, as is the relay 404.

The grounding of conductor 162 causes the relay 210 to be energized. The relay 210 operates to open the circuits of the relays 212 and 213 at armature 254, to establish a locking circuit for itself at armature 253, and to open the circuit of the relay 217 at armature 255. The relay 217 is deenergized to prepare one point in the holding circuit at armature 267.

The line relay 619 at the substation operates to complete a circuit for the relays 612 and 617. The relay 612 operates to complete a circuit for the counting relay 722. The counting relay 722 is energized to complete a circuit for the relay 723, which is effective upon the opening of the original energizing circuit for the relay 722, and to open the circuit of the relay 521. The relay 521 is deenergized to open the circuit of the relay 800 at armature 560 and to remove the short-circuit from the relay 607 at armature 561. The relay 607 is energized to remove the short-circuit from the winding of the relay 608. The relay 608 operates to complete a circuit for the relay 609. The relay 609 is energized to establish a locking circuit for itself, to open the circuit of the relays 605 to 608, inclusive, at armature 643, and to remove ground from the conductor 679 at armature 642.

The removal of ground from the conductor 679 opens the locking circuit for the relay 802. The relay 802 is deenergized to remove ground from the conductor 681. The release of the relay 800 causes the deenergization of the relay 603. The relay 603 is deenergized to open the circuit of the relay 601. The relay 601 retracts its armature to complete a circuit for the relay 600. The relay 600 operates to open the trunk circuit.

The line relay 619 is thus deenergized to remove the short-circuit from the relay 618. The relay 618 is operated to remove the short-circuit from the counting relay 723. The counting relay 723 operates to complete a circuit for the relay 522 at armature 557, to remove the short-circuit from the relay 724 at armature 755 so that the relay 724 is energized in series with all the counting relays, and at armature 756 opens another point in the original energizing circuit of the relay 722.

The relay 522 operates to complete a circuit for the relay 801 at armature 562. The relay 801 operates to complete a circuit for the relay 602. The relay 602 is energized to close the circuit of the relay 601. The relay 601 operates to open the circuit of the relay 600. The relay 600 is deenergized to complete one point in the control circuit.

The relay 724 operates to complete a circuit for the slow-acting relay 725. The relay 725 is energized to open the circuits of all the counting relays 700 to 723, inclusive, at armature 760, and at armature 761 to remove ground from conductor 691 and to place ground upon conductor 692. The removal of ground from conductor 691 brings about the release of certain relays in the same manner as before described. The grounding of conductor 692 causes the energization of the relay 819.

The relay 819 operates to establish a locking circuit for itself at armature 856, to open the circuit of the relays 816 and 817 at armature 857 and to open the circuit of the relay 809 at armature 858. The relay 809 is deenergized to establish one point in the holding circuit.

The holding circuit is now completed over a path which extends from battery by way of back contact and armature 261, holding relay 216, back contact and armature 267, conductor 274, back contact and armature 428, trunk conductor 460, armature 622 and its back contact, conductor 689, armature 838 and its back contact, holding relay 810, and armature 850 and its back contact to ground. The holding relays 216 and 810 are now energized in series.

The relay 216 operates to complete a circuit for the relay 211 at armature 264 and to prepare a circuit for the relay 215 at armature 265. The relay 211 is operated to open the locking circuit of the relay 210 at armature 256, and to open the locking circuit of the relay 209 at armature 257. The relay 210 is deenergized to establish a circuit for the relay 215. The relay 215 is energized to prepare a circuit for the relay 212 at armature 263. The relay 209 is deenergized to restore certain circuits to normal.

At the substation, the relay 810 is operated to complete a circuit for the relay 818 at armature 839 and to prepare a circuit for the relay 811 at armature 840. The relay 818 is energized to open the circuit of the relay 819 at armature 854 and to open the locking circuit of the relay 609 at armature 855. The relay 819 is deenergized to establish a circuit for the relay 811. The relay 811 is energized to prepare a circuit for the relay 817. The apparatus is thus restored to normal in the manner above described.

The foregoing is the description of the normal operation of the system when the dispatcher desires to control an apparatus unit or circuit interrupter at the substation.

In the above description, when the circuit breaker C operates, the relay 806 is energized momentarily. As a result of this operation, a circuit is completed extending from ground by way of armature 834 and its front contact, armature 842 and its back contact, back contact and armature 846, and relay 813 to battery. The relay 813 is energized to prepare a circuit for the relay 812 at armature 845, and to complete a circuit extending from ground by way of back contact and armature 843, armature 844 and its front contact, relay 814 and relay 813 to battery. The relay 814 is not energized at this time by reason of the fact that it is short-circuited as long as the original energizing circuit for the relay 813 is maintained.

When the relay 806 is deenergized, the relay 814 is immediately operated and ground is placed upon the armature 842. When the relay 811 is energized, as before described, a circuit is completed for the relay 817. The relay 817 operates to complete a circuit for the relay 815 at armature 852, and at armature 853 completes a circuit extending from ground by way of armature 828 and its back contact, front contact and armature 853, armature 845 and its front contact and relay 812 to battery.

Another result of the operation of the relay 817 is that a circuit is completed for the relay 816 which is not effective until the original energizing circuit of the relay 817 is opened. The relay 812 operates to open the circuits of the relays 813 and 814. The relay 815 operates to open the original energizing circuit of the relay 817 and the relay 816 is permitted to be energized. As a result of the operation of the relay 816, the circuit of the holding relays 216 and 810 is opened and the above operations are repeated, that is, the selective apparatus again functions. This operation checks the condition of all the apparatus units and assures the dispatcher that his signals correspond to the setting of the units at the substation.

During this second operation, when the selecting relays 313 and 511 are energized, no current from either of the generators 219 or 220 is applied to the signalling circuit by reason of the fact that the armatures of the relay 214 are in their retracted position, and, consequently, the switching operation is performed by the application of alternating current from the generator 221. An operation may be performed by the dispatcher operating the key K—1 to a position opposite from that shown, thereby bringing about the application of signalling current from the generator 219 to the trunk circuit.

When the proper answer-back signal has been received as a result of the operation of the circuit breaker, the relay 205 is energized and the circuit of the relay 203 is opened. As a result of this operation, and also as a result of the key K—1 being in the opposite position, the relay 204 is energized.

By the provision of these circuit arrangements, it will be seen that it is impossible to operate a circuit breaker twice from the dispatcher's office. That is, should the dispatcher desire to close a circuit breaker and perform such operation in the manner described, and that apparatus unit be tripped by the operation of automatic devices (not shown) at the substation, an answer-back signal will, of course, be transmitted to the dispatcher in a manner that will be obvious from the above description. Under these conditions, the armatures 230 and 231 of the relay 204 will be in a released position. It is now impossible for the dispatcher to close the circuit interrupter by operating the common control key K.

In order to cause the operation of the circuit interrupter, it is necessary for him to operate the key K—1 to the position opposite from that shown. Should this be done, and the control key K then operated, no operation of the unit will occur by reason of the fact that the signalling current from the generator 219 will be sent over the signalling circuit. As this would ordinarily cause a tripping operation of the interrupter and the interrupter is in tripped position, no action will occur.

When the key K—1 is then operated into the position shown, it is possible for the dispatcher to then close the circuit interrupter. It will thus be seen that it is necessary for the dispatcher to follow the action of the circuit interrupters in the manipulation of his keys associated with the individual units. This prevents pumping of the circuit interrupter since after an interrupter trips, the key must first be moved to the open position and then to the closed before the circuit interrupter can be closed.

In the event that an apparatus unit at the substation operates under the control of automatic devices in response to circuit conditions (not shown), the dispatcher is apprised of the operation of the unit by the operation of the selecting devices. In the event that this operation occurs when the apparatus is normal, the momentary operation of the common relay 806 causes the operation of the relay 817. In the event that the selective apparatus is functioning when an automatic operation occurs, the relays 813 and 814 are operated by the momentary operation of the relay 806. By either of these operations, the selective equipment is caused to function in an obvious manner.

There is a possibility that, in the signalling operations, the generators may generate an alternating current that is not of the correct frequency, or, in the same manner, mechanically tuned relays, such as 307 and 308, at the dispatcher's office, and relays 500, 501 and 502, at the substation, may be out of adjustment and two or more relays operated simultaneously. Under these conditions, no operation occurs, by reason of the fact that, when two mechanically tuned relays are simultaneously operated, the signalling circuits that control the operation of the signalling devices at the substation and the apparatus units at the dispatcher's office are opened. In this manner, the difficulty is obviated.

Attention is also directed to the fact that, unless the control circuit at both the dispatcher's office and substation functions in the proper sequence, the two line relays at both the dispatcher's office and substation will not be connected to the control circuit in the proper sequence. Under these conditions, neither line relay will be energized by reason of the fact that the current supplied by the battery B at the dispatcher's office will be in opposition to the current supplied by the battery B—1 at the substation. Inasmuch as this switching operation is dependent upon the proper action of the relays comprising the counting relay chain, the selecting relays and the switching relays that control the switching of the trunk circuit from control to signalling, it will be seen that the system is safeguarded against false operation in every respect.

My invention is not limited to the particular arrangement of the apparatus illustrated, but may be variously modified without departing from the spirit and scope thereof, as set forth in the appended claims.

I claim as my invention:

1. In an electrical control system comprising a dispatcher's office, a station, apparatus units in said station and signalling devices in said office, the combination with a two-conductor trunk line connecting said office and station, relay-chain selecting devices at said office and station, of means, including said trunk line, for operating said selecting devices to select simultaneously said units and said signalling devices in a predetermined sequence, means for stopping the operation of the selecting devices in a predetermined position before they reach the end of their normal sequence of operation, and switching means for rendering said trunk line available for direct control of the operation of any of said units, after the operation of said selecting devices.

2. In an electrical control system comprising a dispatcher's office, a station, apparatus units in said station, and relay-chain selecting devices in said office and station, the combination with an electric circuit connecting said office and station, of sources of direct current and a source of alternating current, means including said sources of direct current for operating said selecting devices over said circuit to select said units in a predetermined sequence, and means for thereafter connecting said source of alternating current to the same circuit to operate a selected unit.

3. In an electrical control system comprising a dispatcher's office, a station, apparatus units in said station, the combination with relay-chain selecting devices in said office and said station, of a circuit connecting said office and station, of a source of direct current and a source of alternating current, means including said source of direct current for operating said selecting devices over said circuit to select said units in a predetermined sequence, and means for thereafter connecting said source of alternating current to said same circuit to operate a selected unit.

4. In a signalling system, a first station, a second station, a signalling line connecting said stations, apparatus units at said second station, signalling devices individual thereto at said first station, a distributor at each of said stations comprising an individual position for each unit, means including said signalling line for operating said distributors in synchronism to sequentially connect said apparatus units for operation from said first station, means for bringing said distributors to a stop at a predetermined selected position individual to one of said apparatus units, means including said signalling line for selectively operating one of said selected apparatus units, and means including said signalling line for operating said signalling device individual to said apparatus unit in response to the operation of said apparatus unit.

5. In a signalling system, a first station, a second station, a signalling line connecting said stations, apparatus units at said second station, signalling devices individual thereto at said first station, a distributor at each of said stations comprising an individual position for each unit, means for operating said distributors in synchronism for selectively conditioning said apparatus units for operation from said first station, means for bringing said distributors to a stop at a predetermined position individual to a selected apparatus unit, a source of alternating current at said first station, means including said source of alternating current and said signalling line for selectively operating said apparatus unit, a second source of alternating current at said second station, and means including said second source of alternating current for operating the signalling device individual to said apparatus unit in response to the operation of said apparatus unit.

6. In a signalling system, a first station, a second station, apparatus units at said second station, signalling devices individual thereto at said first station, a signalling line connecting said stations, synchronously operated selectors for selecting said apparatus units sequentially for operation from said first station, means including said signalling line for operating said synchronous selectors, means including said synchronous selectors in operated positions for conditioning one of said apparatus units for operation from said first station for an indefinite period of time, means including said signalling line for selectively operating said selected apparatus unit and means including said signalling line for operating said signalling device in response to the operation of said apparatus unit.

7. In a supervisory control system, a first station, a second station, apparatus units at said second station, signalling devices individual thereto at said first station, a signalling line connecting said stations, synchronously operated distributors at each of said stations having a position individual to each of said units, means including said signalling line for operating said synchronously operated distributors, means controlled from said first station for bringing said distributors to a stop at any desired selecting position for selecting one of said apparatus units, means for selectively operating said selected apparatus unit from said first station, means including said signalling line for operating said signalling devices in response to the operation of said apparatus units and means controlled from said first station for starting said selectors into operation.

8. In a signalling system, a first station, a second station, apparatus units at said second station, signalling devices individual thereto at said first station, a signalling line connecting said stations, synchronously operated selectors at each of said stations, means including said signalling line for maintaining said selectors in synchronism to simultaneously select said apparatus units and their individual signalling devices, means responsive to the operation of any one of said apparatus units to operate said signalling device individual thereto over said signalling line, means for stopping said selectors from operating while said signalling devices are being operated in response to the operation of said apparatus unit, and means responsive to the operation of said signalling device for starting said selectors into operation.

9. In a signalling system a first station, a second station, apparatus units at said second station, signalling devices individual thereto at said first station for indicating the condition of said units, a signalling line connecting said stations, selectors comprising a position for each unit and signalling device at said stations for simultaneously associating corresponding units and devices with said line, means including said signalling line for operating said selectors in synchronism, means controlled from said first station for stopping the operation of said selectors at a predetermined position individual to one of said apparatus units, means for selectively operating said apparatus units from said first station and means controlled from said first station for starting said selectors into operation.

10. In a signalling system, a first station, a second station, apparatus units at said second station, signalling devices individual thereto at said first station, a signalling line connecting said stations, synchronously operated selectors for selecting one of said apparatus units and signalling devices, means including said signalling line for operating said synchronous selectors to an operative position for conditioning one of said apparatus units for operation from said first station for an indefinite period of time, means including said signalling line for selectively operating said selected apparatus unit and means including said signalling line for operating said selected signalling device in response to the operation of said apparatus unit.

11. In a signalling system, a first station, a second station, a signalling line connecting said station, apparatus units at said second station, signalling devices individual thereto at said first station, a relay chain at each of said stations comprising an individual position for each unit, means including said signalling line for operating said relay chains in synchronism to sequentially connect said apparatus units for operation from said first station, means for bringing said relay chains to a stop at a predetermined selected position individual to one of said apparatus units, means including said signalling line for selectively operating one of said selected apparatus units, and means including said signalling line for operating the signalling device individual to said apparatus unit in response to the operation of said apparatus unit.

In testimony whereof, I have hereunto subscribed my name this 28th day of May, 1924

THOMAS U. WHITE.